(12) United States Patent
Watanabe et al.

(10) Patent No.: US 6,819,498 B1
(45) Date of Patent: Nov. 16, 2004

(54) TWO-WAVELENGTH ANTIREFLECTION FILM AND OBJECTIVE LENS COATED WITH TWO-WAVELENGTH ANTIREFLECTION FILM

(75) Inventors: Tadashi Watanabe, Kamiina-gun (JP); Hideto Yamashita, Kamiina-gun (JP); Masato Kohsaka, Komagane (JP); Takao Yamauchi, Ina (JP); Kiyonobu Kurata, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/424,264

(22) Filed: Apr. 28, 2003

(51) Int. Cl.[7] .............................. G02B 21/02; G02B 1/10
(52) U.S. Cl. ........................................ 359/656; 359/581
(58) Field of Search ................................ 359/355, 586, 359/581, 588, 656

(56) References Cited

FOREIGN PATENT DOCUMENTS

JP  11-167067 A  6/1999
JP  2001-318317  11/2001

*Primary Examiner*—David N. Spector
(74) *Attorney, Agent, or Firm*—Frishauf, Holtz, Goodman & Chick, P.C.

(57) ABSTRACT

A two-wavelength antireflection film to prevent light in two-wavelength regions of a deep-ultraviolet region and a region from a visible region to the near-infrared region on a surface of a substrate by coating the two-wavelength anti-reflection film on the surface of the substrate which penetrates light from the deep-ultraviolet region to the near-infrared region, comprising a first thin film which is formed on the substrate, and has a refractive index of 1.6 to 2.0 and optical film thickness of $0.4\lambda$ to $0.7\lambda$ for design main wavelength ($\lambda$), a second thin film which is formed on the first thin film, and has a refractive index of 1.35 to 1.55 and an optical film thickness of $0.05\lambda$ to $0.6\lambda$ for the design main wavelength $\lambda$, a third thin film which is formed on the second thin film, and has a refractive index of 1.6 to 2.0 and an optical film thickness of $0.1\lambda$ to $0.5\lambda$ for the design main wavelength $\lambda$, and a fourth thin film which is formed on the third thin film, and has a refractive index of 1.35 to 1.55 and an optical film thickness of $0.2\lambda$ to $0.35\lambda$ for the design main wavelength $\lambda$.

11 Claims, 12 Drawing Sheets

Spectral reflectance characteristic of two wavelength antirelection film (Angular characteristic)

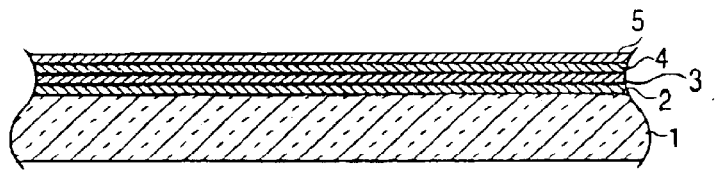
FIG. 1
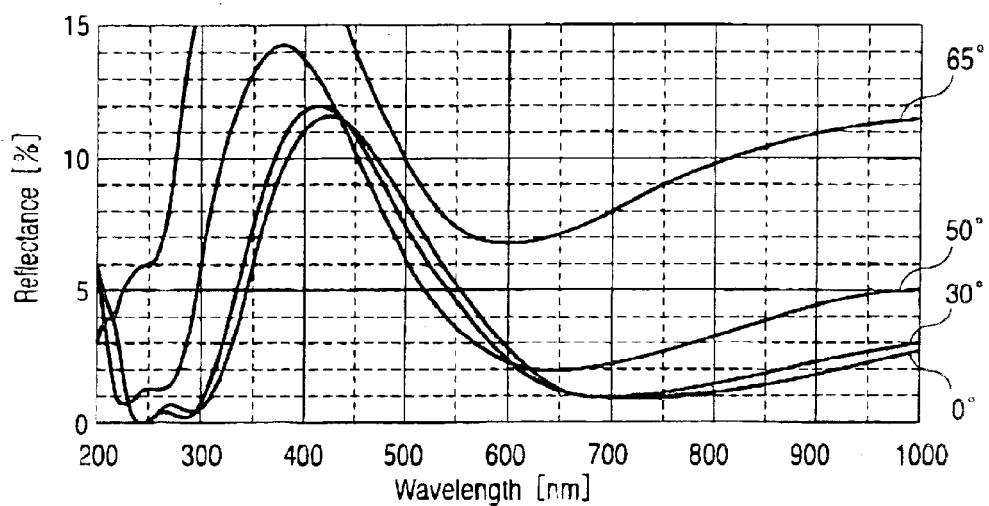
FIG. 2  Spectral reflectance characteristic of two wavelength antireflection film (Angular characteristic)
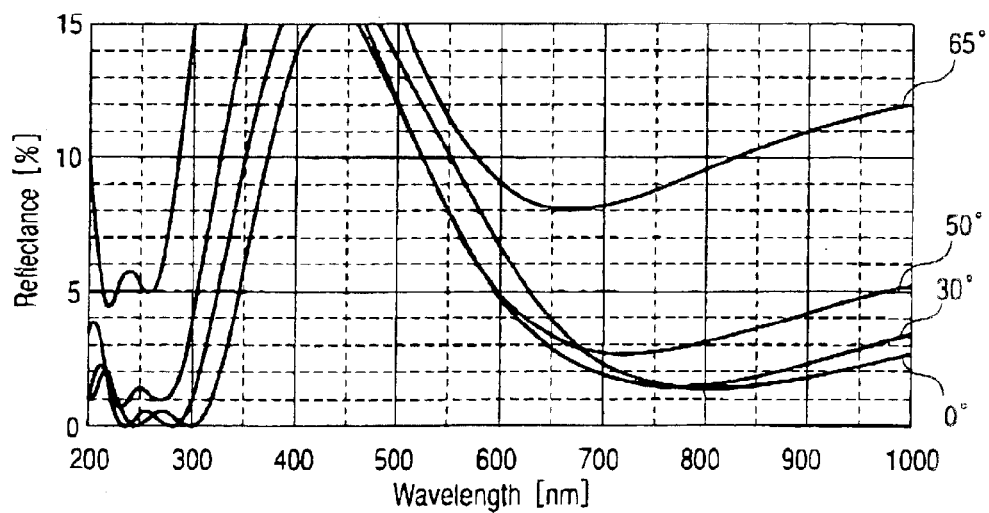
FIG. 3  Spectral reflectance characteristic of two wavelength antireflection film (Angular characteristic)

Spectral reflectance characteristic of two
wavelength antireflection film (Angular characteristic)

Change according to the incident angle of 248nm reflectance

Spectral reflectance characteristic of two wavelength antireflection film (At vertical incidence)

Spectral reflectance characteristic of two wavelength antireflection film (At vertical incidence)

Spectral reflectance characteristic of two wavelength antirelection film (At vertical incidence)

Change according to the incident angle of 248nm reflectance

Spectral reflectance characteristic of two wavelength antirelection film (At vertical incidence)

Spectral reflectance characteristic of two wavelength antirelection film (At vertical incidence)

Spectral reflectance characteristic of two wavelength antirelection film (At vertical incidence)

Spectral reflectance characteristic of two wavelength antirelection film (At vertical incidence)

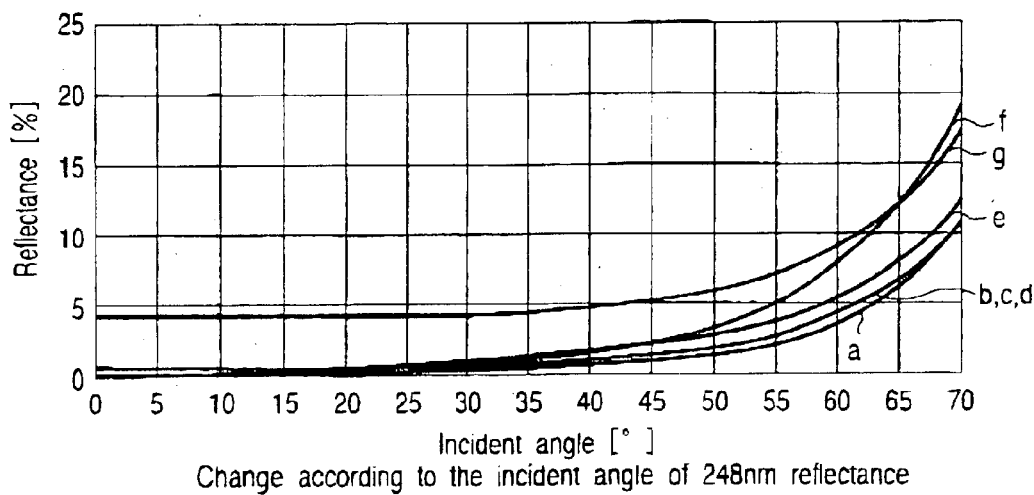
Change according to the incident angle of 248nm reflectance
F I G. 14
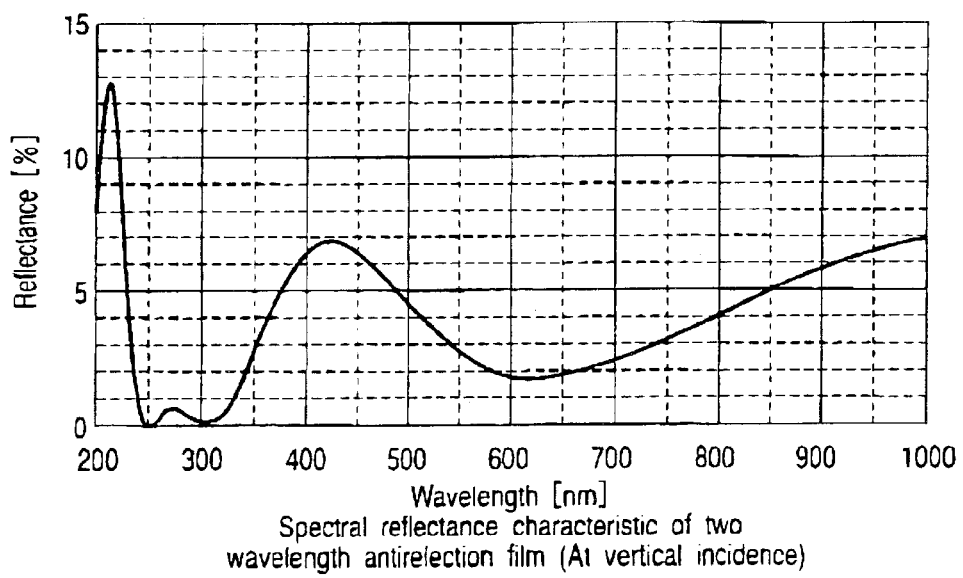
Spectral reflectance characteristic of two
wavelength antireflection film (At vertical incidence)
F I G. 15

Spectral reflectance characteristic of two wavelength antireflection film (At vertical incidence)

Spectral reflectance characteristic of two wavelength antireflection film (Angular characteristic)

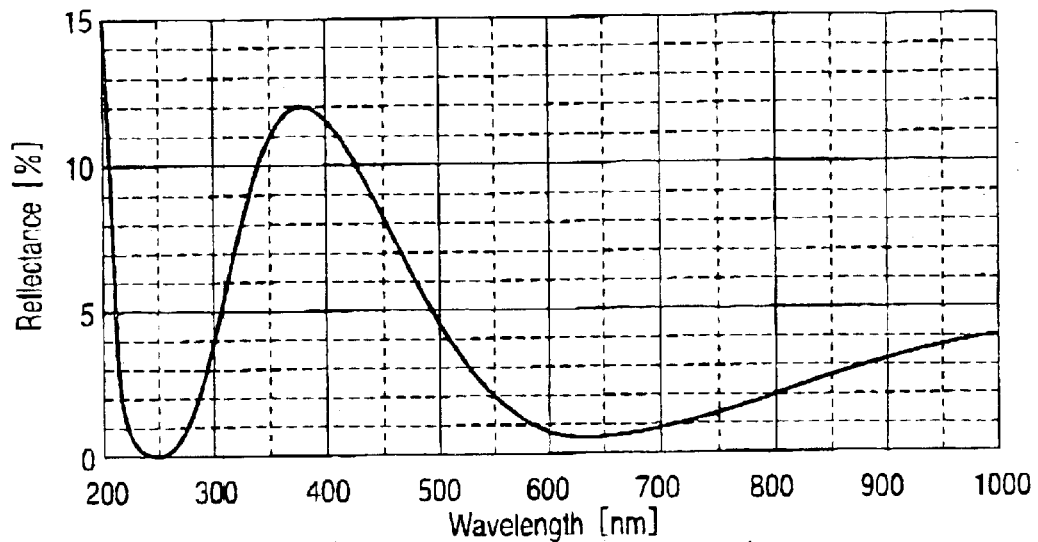
F I G. 18
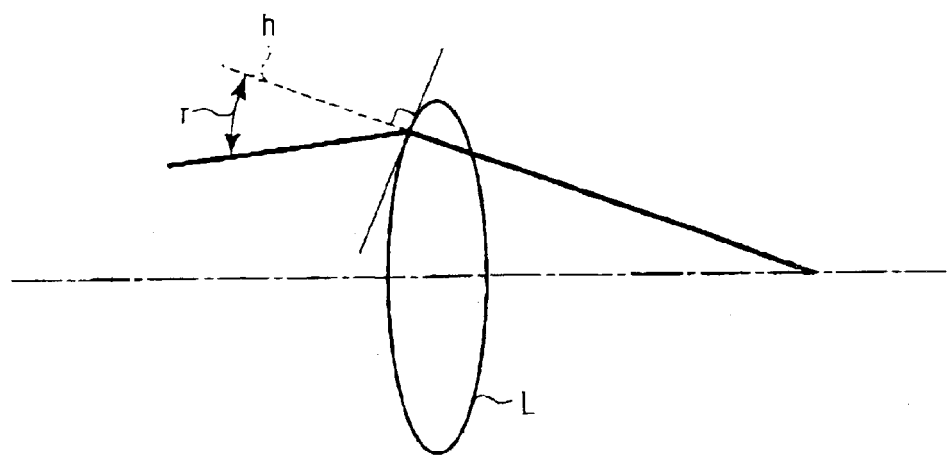
F I G. 20

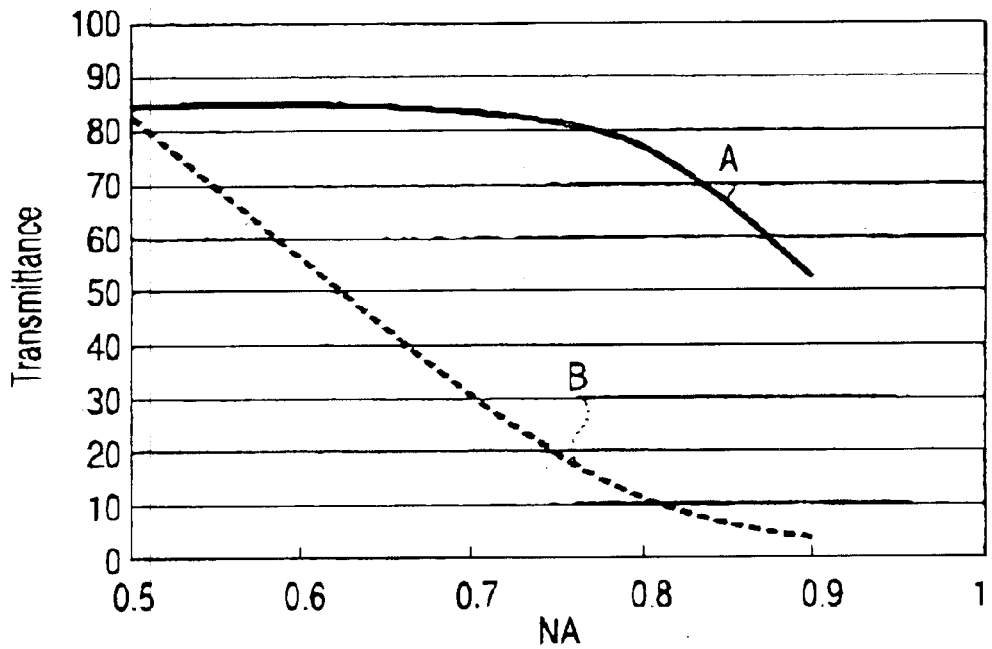
F I G. 21
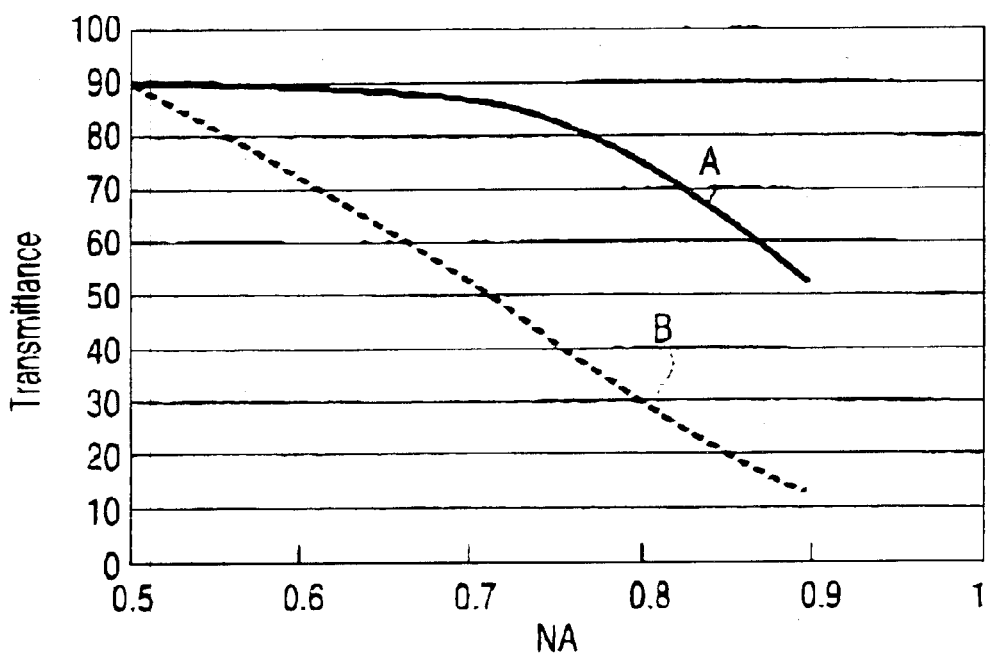
F I G. 23

TWO-WAVELENGTH ANTIREFLECTION FILM AND OBJECTIVE LENS COATED WITH TWO-WAVELENGTH ANTIREFLECTION FILM

BACKGROUND OF THE INVENTION

1. Field of the Invention

The present invention relates to a two-wavelength anti reflection film which prevents reflection for two-wavelength regions of a deep-ultraviolet region and a region from a visible region to a near-infrared region, and relates to an objective lens for optical device with a high numerical aperture and a high magnification, on which the two-wavelength antireflection film is coated.

2. Description of the Related Art

Recently, the magnetic head used for the semiconductors of a CPU and a hard disk drive etc. has been downsized. As a result extremely high resolving power is required, to accurately detect defects in the product etc., in the inspection apparatus used for these inspections.

An optical microscope which includes a visible ray is typically used for the above-mentioned inspection apparatus. In this case, a resolution of the optical microscope is determined by 0.61×(wavelength/NA). Therefore, it is necessary to enlarge an NA of the objective lens or to shorten the wavelength of the ray in order to obtain enough resolution.

However, recently, enlarging NA of an objective lens is approaching its limits. Therefore, to obtain further resolving power, a microscope which shortens wavelength, i.e., a DUV microscope which makes resolving power twice or more by using a deep-ultraviolet region (Deep UV), has been put to practical use.

By the way, the DUV microscope uses a laser and/or a general-purpose are lamp such as mercury lamps, as a light source. The laser outputs lights with a high intensity ray at a specific wavelength, but the apparatus becomes large and expensive. On the other hand, the general-purpose arc lamp outputs light with low intensity at a specific wavelength, but the apparatus thereof can be downsized and reduced in cost.

Then, it is noted that the general-purpose arc lamp emits light in a wideband. The general-purpose art lamp, that an optical amount is secured by widening the wavelength region, is considered to be used as a light source. However, when such a general-purpose arc lamp is used as the light source, it is necessary to compensate the chromatic aberration. Therefore, the single lens having a medium with a different refractive index, for example, a lens which can compensate for the chromatic aberration by bonding, for instance, fluorite glass and quartz glass with bonding agent has been put to practical use as the DUV objective lens used for the DUV microscope.

However, irradiation of light in the DUV region degrades the bonding agent to reduce the transmittance of the objective lens in the lens In which fluorite glass and quartz glass are bonded.

Therefore, recently, as disclosed in, for example, Japanese Patent Application KOKAI Publication No. 11-167067 and Japanese Patent Application KOKAI Publication No. 2001-318317, an objective lens with no bonding to correct the chromatic aberration using a single lens of the medium with a different refractive index (fluorite glass and quartz glass), and to prevent the reduce in transmittance caused by the degradation of the adhesive by not bonding between these single lenses has been developed.

By the way, an objective lens with no bonding as mentioned above is used to observe the sample image by the light of the deep-ultraviolet region wavelength (for instance, 248 nm). In addition, the objective lens of no bonding might be used to correspond also to the automatic focusing by using the light of wavelength from the visible region to the near-infrared region (for instance, 650 to 1000 nm), so-called auto focus function (hereafter, AF).

In this case, the objective lens should have high transmittance simultaneously with the light of the deep-ultraviolet region wavelength and for the light of wavelength from the visible region to the near-infrared region.

BRIEF SUMMARY OF THE INVENTION

A two-wavelength antireflection film to prevent light in two-wavelength regions of a deep ultraviolet region and a region from a visible region to the near-infrared region on a surface of a substrate by coating the two-wavelength antireflection film on the surface of the substrate which penetrates light from the deep-ultraviolet region to the near-infrared region according to one aspect of the present invention includes:

a first thin film which is formed on the substrate, and has a refractive index of 1.6 to 2.0 and an optical film thickness of $0.4\lambda$ to $0.7\lambda$ for design main wavelength ($\lambda$); a second thin film which is formed on the first thin film, and has a refractive index of 1.35 to 1.55 and an optical film thickness of $0.05\lambda$ to $0.6\lambda$ for the design main wavelength ($\lambda$); a third thin film which is formed on the second thin film, and has a refractive index of 1.6 to 2.0 and an optical film thickness of $0.1\lambda$ to $0.5\lambda$ for the design main wavelength; and a fourth thin film which is formed on the third thin film, and has a refractive index of 1.35 to 1.55 and an optical film thickness of $0.2\lambda$ to $0.35\lambda$ for the design main wavelength $\lambda$.

The objective lens used for an optical equipment, which performs an observation by the light of the deep-ultraviolet region wavelength of 300 nm or less and has a focusing mechanism (auto focus) in the wavelength region from a visible region to a near-infrared region according to one aspect of the present invention, includes a plurality of single lenses, wherein each of the plurality of single lenses has a two-wavelength antireflection film according to claim 1 on the surface thereof.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention FIG. 1 is a figure showing a schematic configuration of the two-wavelength antireflection film according to the first embodiment of the present invention;

FIG. 2 is a figure showing the spectral reflectance characteristic of a two-wavelength antireflection film according to the first embodiment of the present invention;

FIG. 3 is a figure showing the spectral reflectance characteristic of a two-wavelength antireflection film according to the second embodiment of the present invention;

FIG. 14 is a figure showing the change of 248 nm reflectance according to the incident angle in the eighth to twelfth embodiments of the present invention;

FIG. 15 is a figure showing the spectral reflectance characteristic of a two-wavelength antireflection film according to the eleventh embodiment of the present invention;

FIG. 18 is a figure showing the spectral reflectance characteristic of a two-wavelength antireflection film in the second comparison example to explain the present invention;

FIG. 20 is a figure to explain the angle of the incident (or output) light into (or from) the normal of the lens of the thirteenth embodiment of the present invention;

FIG. 21 is a figure to explain an example of comparing transmittance of the thirteenth embodiment of the present invention;

FIG. 23 is a figure to explain an example of comparing transmittance of the fourteenth embodiment of the present invention.

DETAILED DESCRIPTION OF THE INVENTION

Figure 4:
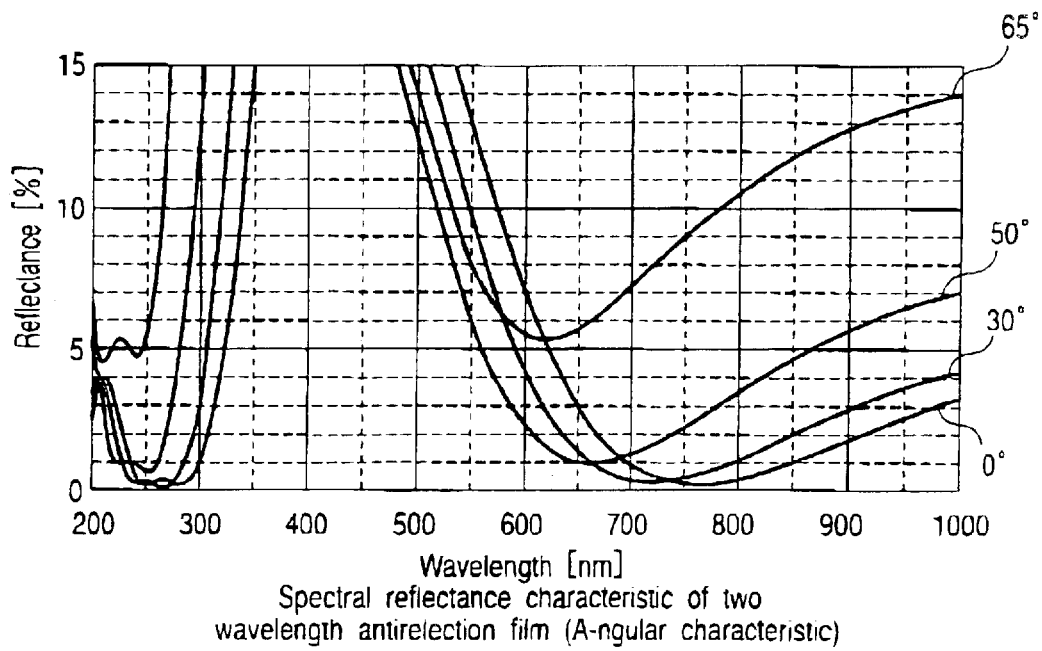
FIG. 4 is a figure showing the spectral reflectance characteristic of a two-wavelength antireflection film according to the third embodiment of the present invention.

Hereinafter, embodiments of the present invention will be explained referring to the drawings.

(First Embodiment)

FIG. 1 shows a schematic configuration of the two-wavelength antireflection film to which the first embodiment of the present invention is applied. In FIG. 1, quartz glass, which is transparent from the deep-ultraviolet region to the near-infrared region, is used as a substrate material for the substrate 1. Thin films 2, 3, 4, and 5 are formed on the substrate 1 as two-wavelength antireflection film to form a four-layer structure.

The film material and the film thickness of each of thin films 2, 3, 4, and 5 is shown in (A) of Table 1. Table 1 collectively shows the film material and the film thickness corresponding to the first to third embodiments ((A) to (C)) as described later.

TABLE 1

| | A | | B | | C | |
|---|---|---|---|---|---|---|
| | | | Substrate 1 | | | |
| | Quartz glass | | Quartz glass | | Quartz glass | |
| | | | Design wavelength λ | | | |
| | 248 nm | | 248 nm | | 248 nm | |
| | Film material | Film thickness (×λ) | Film material | Film thickness (×λ) | Film material | Film thickness (×λ) |
| Thin film 2 | Al₂O₃ | 0.51 | Al₂O₃ + La₂O₃ (Substance M2) | 0.46 | Al₂O₃ + La₂O₃ (Substance M3) | 0.46 |
| Thin film 3 | MgF₂ | 0.46 | MgF₂ | 0.47 | MgF₂ | 0.50 |
| Thin film 4 | Al₂O₃ | 0.16 | Al₂O₃ + La₂O₃ (Substance M2) | 0.26 | Al₂O₃ + La₂O₃ (Substance M3) | 0.16 |
| Thin film 5 | MgF₂ | 0.30 | MgF₂ | 0.25 | MgF₂ | 0.30 |

In (A) of Table 1, the film materials of thin films 2, 3, 4, and 5, each of which forms each layer, are as follows. $Al_2O_3$ whose refractive index in design main wavelength (248 nm in the deep-ultraviolet region) is the middle refractive index of about 1.7 is used to thin film 2 of the first layer and thin film 4 of the third layer from the substrate 1. $MgF_2$ whose refractive index in design main wavelength (248 nm in the deep-ultraviolet region) is the low refractive index of about 14 is used to thin film 3 in the second layer and thin film 5 in the fourth layer from the substrate 1. Each film thickness of these thin films 2, 3, 4, and 5 is shown in (A) of Table 1.

Figure 5:
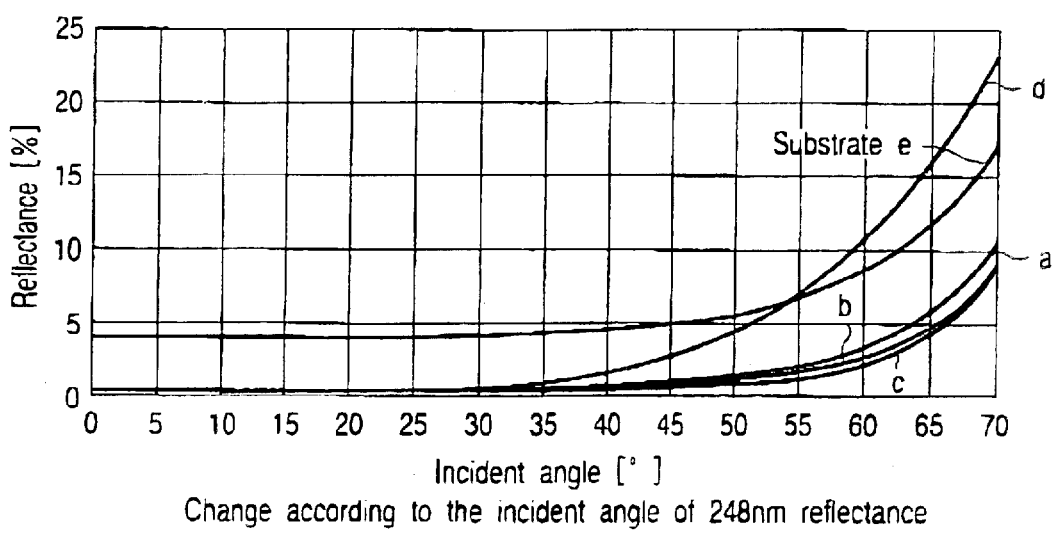
FIG. 5 is a figure showing the change of 248 nm reflectance according to the incident angle in the first to third embodiments of the present invention.

FIG. 2 shows each spectral reflectance characteristic for the two wavelength antireflection film made for trial purposes with the configuration shown in (A) of Table 1, when changing the incident angle of the light to 0°, 30°, 50°, and 65°, respectively. By changing the incident angle of the light, the curve (a) of FIG. 5 is obtained as a result of simulating the numerical value how the reflectance of the light of design main wavelength (248 nm) is changed.

As is clear from FIG. 2, it becomes possible to perform antireflection because reflectance becomes small in two-wavelength region in the vicinity of 248 nm and within the range of 650 nm to 800 nm. It is also clear that the reflection of design main wavelength (248 nm) is small in the range of 0° to 70° in incident angle of light as shown in curve (a) of FIG. 5. Therefore, by forming the two-wavelength antireflection film configured with thin films 2, 3, 4, and 5 according to the first embodiment on the substrate 1 of quartz glass which is transparent from the deep-ultraviolet region to the near-infrared region, high transmittance can be achieved for light in the deep-ultraviolet region in the vicinity of design main wavelength (248 nm) and light from the visible region to the near-infrared region in the vicinity of the range of 650 nm to 800 nm, which are used for auto focus.

(Second Embodiment)

The schematic configuration of the two-wavelength antireflection film according to the second embodiment is similar to that in FIG. 1, and the explanation will be described by using FIG. 1.

The film material and the film thickness of each of thin films 2, 3, 4, and 5 of two-wavelength antireflection films configured as FIG. 1 is shown in (B) of Table 1.

In this case, the film materials of thin films 2, 3, 4, and 5, each of which forms each layer, are as follows. The mixture of $Al_2O_3$ and $La_2O_3$ with the middle refractive index material is used to thin film 2 of the first layer and thin film 4 of the third layer from the substrate 1. Specifically, Substance M2 made by the Merck, which is the mixture of $Al_2O_3$ and $La_2O_3$ whose refractive index is about 1.8 in design main wavelength (248 nm in the deep-ultraviolet region) is used. $MgF_2$ whose refractive index in design main wavelength (248 nm in the deep-ultraviolet region) is the low refractive index of about 1.4 is used to thin film 3 in the second layer and thin film 5 in the fourth layer from the substrate 1 similar to the first embodiment. Each film thickness of these thin films 2, 3, 4, and 5 is shown in (B) of Table 1.

FIG. 3 shows each spectral reflectance characteristic for the two wavelength antireflection film made for trial purposes with the configuration shown in (B) of Table 1, when changing the incident angle of the light to 0°, 30°, 50°, and 65°, respectively. By changing the incident angle of the light, the curve (b) of FIG. 5 is obtained as a result of simulating the numerical value how the reflectance of the light of design main wavelength (248 nm) is changed.

As is clear from FIG. 3, it becomes possible to perform antireflection because reflectance becomes small in two—two-wavelength region in the vicinity of 248 nm and within the range of 650 nm to 800 nm. It is also clear chat the reflection of design main wavelength (248 nm) is small in the range of 0° to 70° in incident angle of light as shown in curve (b) of FIG. 5.

Therefore, high transmittance can be achieved for light in the deep-ultraviolet region in the vicinity of design main wavelength (248 nm) and light from the visible region to the near-infrared region in the vicinity of the range of 650 nm to 800 nm, which are used for auto focus similar to that described in the first embodiment (Third Embodiment)

The schematic configuration of the two-wavelength antireflection film according to the third embodiment is similar to that in FIG. 1, and the explanation will be described by using FIG. 1.

The film material and the film thickness of each of thin films 2, 3, 4, and 5 of two-wavelength antireflection films configured as FIG. 1 is shown in (C) of Table 1.

In this case, the film materials of thin films 2, 3, 4, and 5, each of which forms each layer, are as follows. The mixture of $Al_2O_3$ and $La_2O_3$ with the middle refractive index material, whose mixture ratio of $Al_2O_3$ and $La_2O_3$ and refractive index are different from those in the second embodiment, is used to thin film 2 of the first layer and thin film 4 of the third layer from the substrate 1. Specifically, Substance M3 made by the Merck, which is the mixture of $Al_2O_3$ and $La_2O_3$ whose refractive index in design main wavelength (248 nm in the deep-ultraviolet region) is about from the deep-ultraviolet region to the near-infrared region, is used as a substrate material for the substrate 1.

The film material and the film thickness of each of thin films 2, 3, 4, and 5 of two-wavelength antireflection films configured as FIG. 1 is shown in (A) of Table 2. Table 2 collectively shows the film material and the film thickness corresponding to the fourth to fifth embodiments ((A) to (C)) as described later.

TABLE 2

| | A | | B | | C | |
|---|---|---|---|---|---|---|
| | | | Substrate 1 | | | |
| | Fluorite glass | | Fluorite glass | | Fluorite glass | |
| | | | Design wavelength λ | | | |
| | 248 nm | | 248 nm | | 248 nm | |
| | Film material | Film thickness (×λ) | Film material | Film thickness (×λ) | Film material | Film thickness (×λ) |
| Thin film 2 | $Al_2O_3$ | 0.47 | $Al_2O_3 + La_2O_3$ (Substance M2) | 0.48 | $Al_2O_3 + La_2O_3$ (Substance M3) | 0.49 |
| Thin film 3 | $MgF_2$ | 0.41 | $MgF_2$ | 0.44 | $MgF_2$ | 0.49 |
| Thin film 4 | $Al_2O_3$ | 0.20 | $Al_2O_3 + La_2O_3$ (Substance M2) | 0.27 | $Al_2O_3 + La_2O_3$ (Substance M3) | 0.31 |
| Thin film 5 | $MgF_2$ | 0.27 | $MgF_2$ | 0.25 | $MgF_2$ | 0.31 |

1.95, is used. $MgF_2$ whose refractive index in design main wavelength (248 nm in the deep-ultraviolet region) is the low refractive index of about 1.4 is used to thin film 3 in the second layer and thin film 5 in the fourth layer from the substrate 1 similar to the first, embodiment. Each film thickness of these thin films 2, 3, 4, and 5 is shown in (C) of Table 1.

FIG. 4 shows each spectral reflectance characteristic for the two wavelength antireflection film made for trial purposes with the configuration shown in (C) of Table 1, when changing the incident angle of the light to 0°, 30°, 50°, and 65°, respectively. By changing the incident angle of the light, the curve (c) of FIG. 5 is obtained as a result of simulating the numerical value how the reflectance of the light of design main wavelength (248 nm) is changed.

As is clear from FIG. 4, it becomes possible to perform antireflection because reflectance becomes small in two—two-wavelength region in the vicinity of 248 nm and within the range of 650 to 800 nm. It is also clear that the reflection of design main wavelength (248 nm) is small in the range of 0° to 70° in incident angle of light as shown in curve (c) of FIG. 5.

Therefore, high transmittance can be achieved for light in the deep-ultraviolet region in the vicinity of design main wavelength (248 nm) and light from the visible region to the near-infrared region in the vicinity of the range of 650 nm to 800 nm, which are used for auto focus similar to that described in the first embodiment.

(Fourth Embodiment)

The schematic configuration of the two-wavelength antireflection film according to the fourth embodiment is similar to that in FIG. 1, and the explanation will be described by using FIG. 1. In this case, fluorite glass, which is transparent In (A) of Table 2, the film materials of thin films 2, 3, 4, and 5, each of which forms each layer, are similar to the first embodiment. $Al_2O_3$ whose refractive index in design main wavelength (248 nm in the deep-ultraviolet region) is the middle refractive index of about 1.7 is used to thin film 2 of the first layer and thin film 4 of the third layer from the substrate 1. $MgF_2$ whose refractive index in design main wavelength (248 nm in the deep-ultraviolet region) is the low refractive index of about 1.4 is used to thin film 3 in the second layer and thin film 5 in the fourth layer from the substrate 1. Each film thickness of these thin films 2, 3, 4, and 5 is shown in (A) of Table 2.

Figure 6:
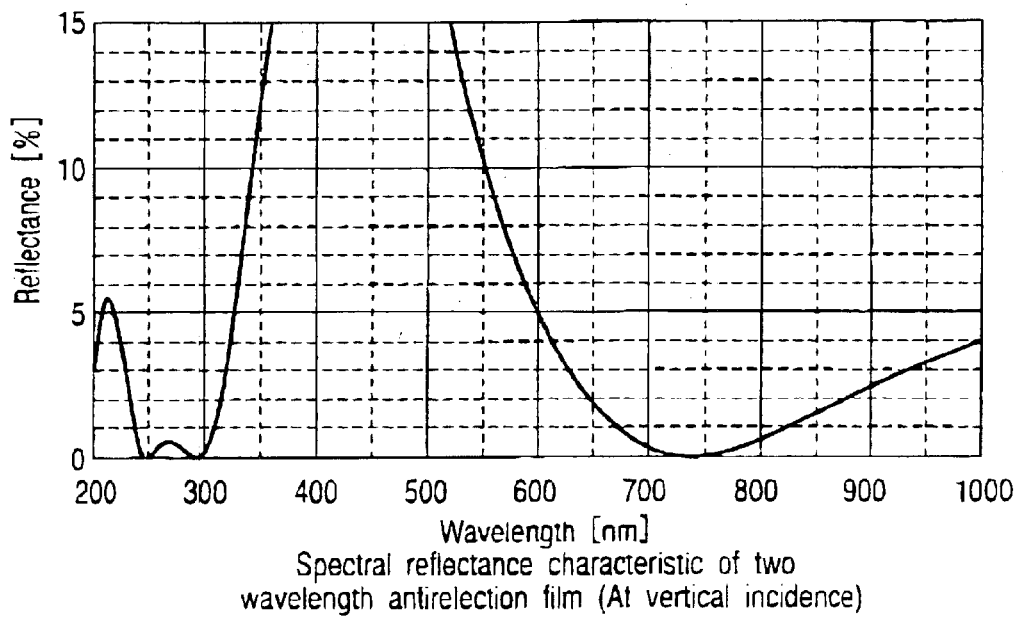
FIG. 6 is a figure showing the spectral reflectance characteristic of a two-wavelength antireflection film according to the fourth embodiment of the present invention.
Figure 9:
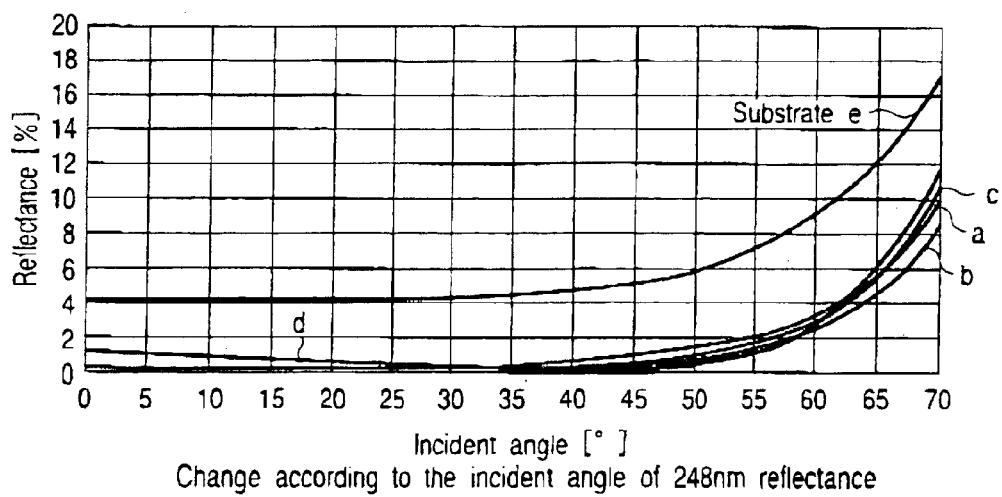
FIG. 9 is a figure showing the change of 248 nm reflectance according to the incident angle in the fourth to seventh embodiments of the present invention.

FIG. 6 shows spectral reflectance characteristic for the two wavelength antireflection film made for trial purposes with the configuration shown in (A) of Table 2, when the incident angle of light is assumed to be 0° (vertical). By changing the incident angle of the light, the curve (a) of FIG. 9 is obtained as a result of simulating the numerical value how the reflectance of the light of design main wavelength (248 nm) is changed As is clear from FIG. 6, it becomes possible to perform antireflection because reflectance becomes small in two-wavelength region in the vicinity of 248 nm and within the range of 650 nm to 800 nm. It is also clear that the reflection of design main wavelength (248 nm) is small in the range of 0° to 70° in incident angle of light as shown in curve (a) of FIG. 9. As a result, a similar advantage to the first embodiment can be expected.

(Fifth Embodiment)

The schematic configuration of the two-wavelength antireflection film according to the fifth embodiment is similar to that in FIG. 1, and the explanation will be described by using FIG. 1. In this case, fluorite glass, which is transparent from the deep-ultraviolet region to the near-infrared region, is used as a substrate material for the substrate 1.

The film material and the film thickness of each of thin film 2, 3, 4, and 5 of two-wavelength antireflection films configured as FIG. 1 is shown in (B) of Table 2.

In this case, the film materials of thin films 2, 3, 4, and 5, each of which forms each layer, are similar to the second embodiment. Substance M2 made by the Merck, which is the mixture of $Al_2O_3$ and $La_2O_3$ whose refractive index is about 1.8 in design main wavelength (248 nm in the deep-ultraviolet region) is used to thin film 2 of the first layer and thin film 4 of the third layer from the substrate 1. $MgF_2$ whose refractive index in design main wavelength (248 nm in the deep-ultraviolet region) is the low refractive index of about 1.4 is used to thin film 3 in the second layer and thin film 5 in the fourth layer from the substrate 1. Each film thickness of these thin films 2, 3, 4, and 5 is shown in (B) of Table 2.

Figure 7:
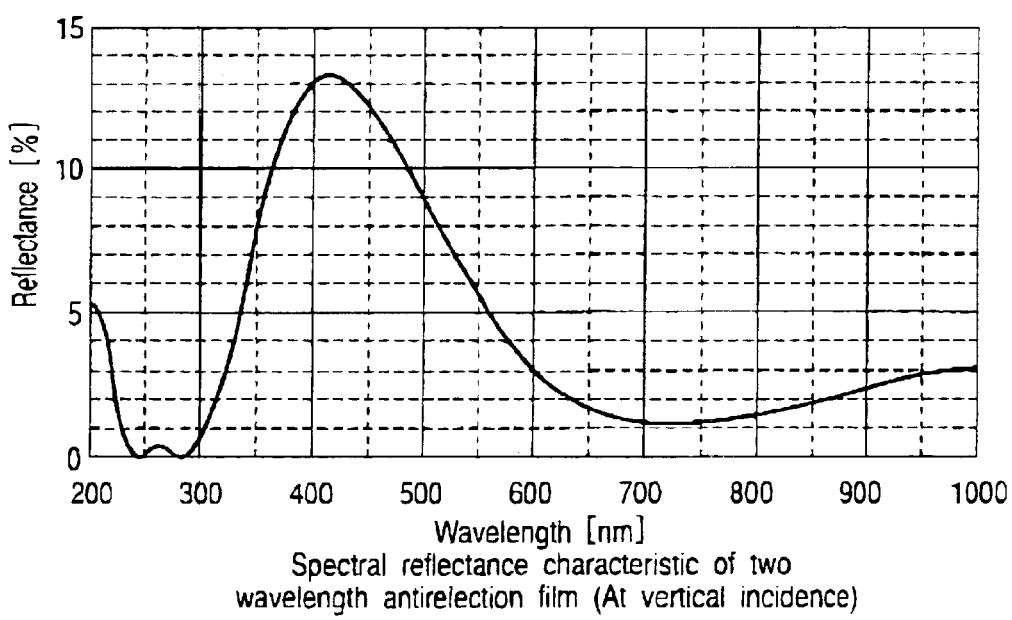
FIG. 7 is a figure showing the spectral reflectance characteristic of a two-wavelength antireflection film according to the fifth embodiment of the present invention.

FIG. 7 shows spectral reflectance characteristic for the two wavelength antireflection film made for trial purposes with the configuration shown in (B) of Table 2, when the incident angle of light is assumed to be 0° (vertical). By changing the incident angle of the light, the curve (b) of FIG. 9 is obtained as a result of simulating the numerical value how the reflectance of the light of design main wavelength (248 nm) is changed.

As is clear from FIG. 7, it becomes possible to perform antireflection because reflectance becomes small in two-wavelength region in the vicinity of 248 nm and within the range of 650 nm to 800 nm. It is also clear that the reflection of design main wavelength (248 nm) is small in the range of 0° to 70° in incident angle of light as shown in curve (b) of FIG. 9. As a result, a similar advantage to the second embodiment can be expected.

(Sixth Embodiment)

The schematic configuration of the two-wavelength antireflection film according to the sixth embodiment is similar to that in FIG. 1, and the explanation will be described by using FIG. 1. In this case, fluorite glass, which is transparent from the deep-ultraviolet region to the near-infrared region, is used as a substrate material for the substrate 1.

The film material and the film thickness of each of thin films 2, 3, 4, and 5 of two-wavelength antireflection films configured as FIG. 1 is shown in (C) of Table 2.

In this case, the film materials of thin films 2, 3, 4, and 5, each of which forms each layer, are similar to the second embodiment. Substance M3 made by the Merck, which is the mixture of $Al_2O_3$ and $La_2O_3$ whose refractive index in design main wavelength (248 nm in the deep-ultraviolet region) is about 1.95, is used is used to thin film 2 of the first layer and thin film 4 of the third layer from the substrate 1. $MgF_2$ whose refractive index in design main wavelength (248 nm in the deep-ultraviolet region) is the low refractive index of about 1.4 is used to thin film 3 in the second layer and thin film 5 in the fourth layer from the substrate 1. Each film thickness of these thin films 2, 3, 4, and 5 is shown in (C) of Table 2.

Figure 8:
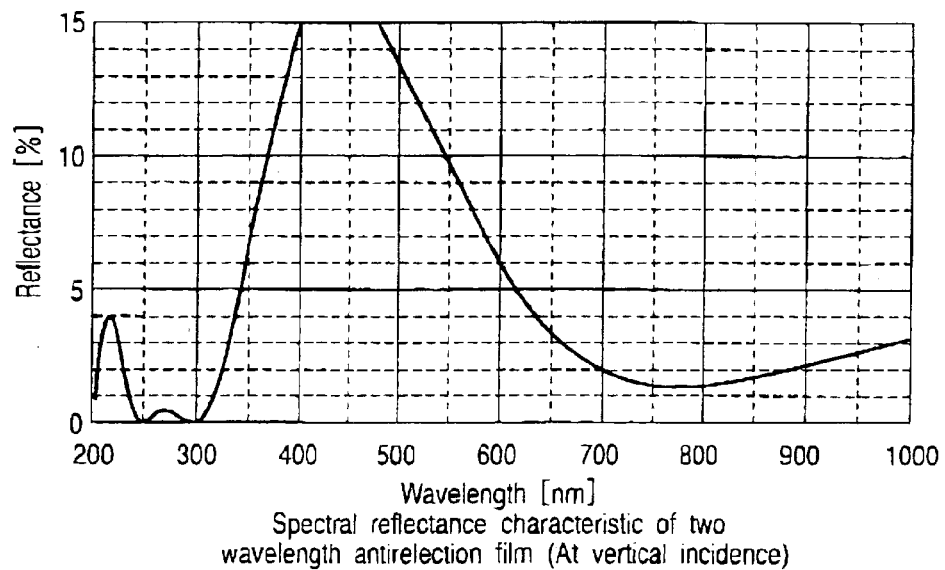
FIG. 8 is a figure showing the spectral reflectance characteristic of a two-wavelength antireflection film according to the sixth embodiment of the present invention.

FIG. 8 shows spectral reflectance characteristic for the two wavelength antireflection film made for trial purposes with the configuration shown in (C) of Table 2, when the incident angle of light is assumed to be 0° (vertical). By changing the incident angle of the light, the curve (c) of FIG. 9 is obtained as a result of simulating the numerical value how the reflectance of the light of design main wavelength (248 nm) is changed.

As is clear from FIG. 8, it becomes possible to perform antireflection because reflectance becomes small in two-wavelength region in the vicinity of 248 nm and within the range of 650 nm to 800 nm. It is also clear that the reflection of design main wavelength (248 nm) is small in the range of 0° to 70° in incident angle of light as shown in curve (c) of FIG. 9. As a result, a similar advantage to the third embodiment can be expected.

(Seventh Embodiment)

The schematic configuration of the two-wavelength antireflection film according to the seventh embodiment is similar to that in FIG. 1, and the explanation will be described by using FIG. 1.

The film material and the film thickness of each of thin films 2, 3, 4, and 5 of two-wavelength antireflection films configured as FIG. 1 is shown in Table 4.

TABLE 3

| | Substrate 1 Quartz glass Design wavelength λ 248 nm | |
|---|---|---|
| Layer number (from substrate) | Film material | Film thickness (×λ) |
| Thin film 2 | $Al_2O_3$ + $La_2O_3$ (Substance M2) | 0.52 |
| Thin film 3 | $MgF_2$ | 0.53 |
| Thin film 4 | $Al_2O_3$ + $La_2O_3$ (Substance M2) | 0.29 |
| Thin film 5 | $MgF_2$ | 0.28 |

In this case, the film materials of thin films 2, 3, 4, and 5, each of which forms each layer, are similar to the second embodiment Substance M2 made by the Merck, which is the mixture of $Al_2O_3$ and $La_2O_3$ whose refractive index is about 1.8 in design main wavelength (248 nm in the deep-ultraviolet region) is used to thin film 2 of the first layer and thin film 4 of the third layer from the substrate 1. $MgF_2$ whose refractive index in design main wavelength (248 nm in the deep-ultraviolet region) is the low refractive index of about 1.4 is used to thin film 3 in the second layer and thin film 5 in the fourth layer from the substrate 1. Each film thickness of these thin films 2, 3, 4, and 5 is shown in Table 3.

Figure 10:
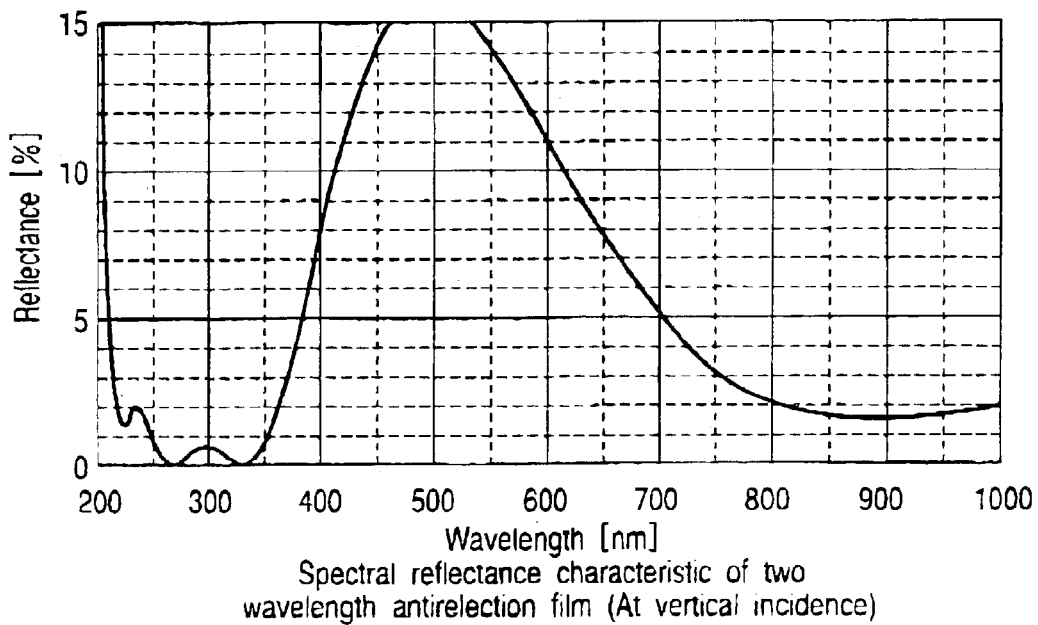
FIG. 10 is a figure showing the spectral reflectance characteristic of a two-wavelength antireflection film according to the seventh embodiment of the present invention.

FIG. 10 shows spectral reflectance characteristic for the two wavelength antireflection film made for trial purposes with the configuration shown in Table 3, when the incident angle of light is assumed to be 0° (vertical). By changing the incident angle of the light, the curve (d) of FIG. 9 is obtained as a result of simulating the numerical value how the reflectance of the light of design main wavelength (248 nm) is changed.

As is clear from FIG. 10, it becomes possible to perform antireflection because reflectance becomes small in two-wavelength region in the vicinity of 248 nm and within the range of 650 nm to 800 nm. Especially, it becomes possible to reduce reflectance further within the range from 30° to 50° in incident angle of design main wavelength (248 nm) as shown in curve (d) of FIG. 9. Therefore, transmittance can be further improved by using such two-wavelength antireflection film.

(Eighth Embodiment)

The schematic configuration of the two-wavelength antireflection film according to the eighth embodiment is similar to that in FIG. 1, and the explanation will be described by using FIG. 1. In this case, quartz glass, which is transparent from the deep-ultraviolet region to the near-infrared region, is used as a substrate material for the substrate 1.

The film material and the film thickness of each of thin films 2, 3, 4, and 5 of two-wavelength antireflection films configured as FIG. 1 is shown in (A) of Table 4. Table 4 collectively shows the film material and the film thickness corresponding to the eighth embodiments ((A) to (C)) as described later.

different from light from the visible region to the near-infrared region used for auto focus within the range of 650 nm to 800 nm described in the first to seventh embodiments.

(Ninth Embodiment)

The schematic configuration of the two-wavelength antireflection film according to the ninth embodiment is similar to that in FIG. 1, and the explanation will be described by using FIG. 1.

TABLE 4

| | A | | B | | C | |
|---|---|---|---|---|---|---|
| | | | Substrate 1 | | | |
| | Fluorite glass | | Fluorite glass | | Fluorite glass | |
| | | | Design wavelength λ | | | |
| | 248 nm | | 248 nm | | 248 nm | |
| | Film material | Film thickness (×λ) | Film material | Film thickness (×λ) | Film material | Film thickness (×λ) |
| Thin film 2 | $Al_2O_3$ | 0.60 | $Al_2O_3 + La_2O_3$ (Substance M2) | 0.67 | $Al_2O_3 + La_2O_3$ (Substance M3) | 0.59 |
| Thin film 3 | $MgF_2$ | 0.12 | $MgF_2$ | 0.87 | $MgF_2$ | 0.98 |
| Thin film 4 | $Al_2O_3$ | 0.34 | $Al_2O_3 + La_2O_3$ (Substance M2) | 0.31 | $Al_2O_3 + La_2O_3$ (Substance M3) | 0.48 |
| Thin film 5 | $MgF_2$ | 0.26 | $MgF_2$ | 0.30 | $MgF_2$ | 0.22 |

In this case, the film materials of thin films 2, 3, 4, and 5, each of which forms each layer, are similar to the first embodiment. $Al_2O_3$ whose refractive index in design main wavelength (248 nm in the deep-ultraviolet region) is the middle refractive index of about 1.7 is used to thin film 2 of the first layer and thin film 4 of the third layer from the substrate 1. $MgF_2$ whose refractive index in design main wavelength (248 nm in the deep-ultraviolet region) is the low refractive index of about 1.4 is used to thin film 3 in the second layer and thin film 5 in the fourth layer from the substrate 1. Each film thickness of these thin films 2, 3, 4, and 5 is shown in (A) of Table 4.

Figure 11:
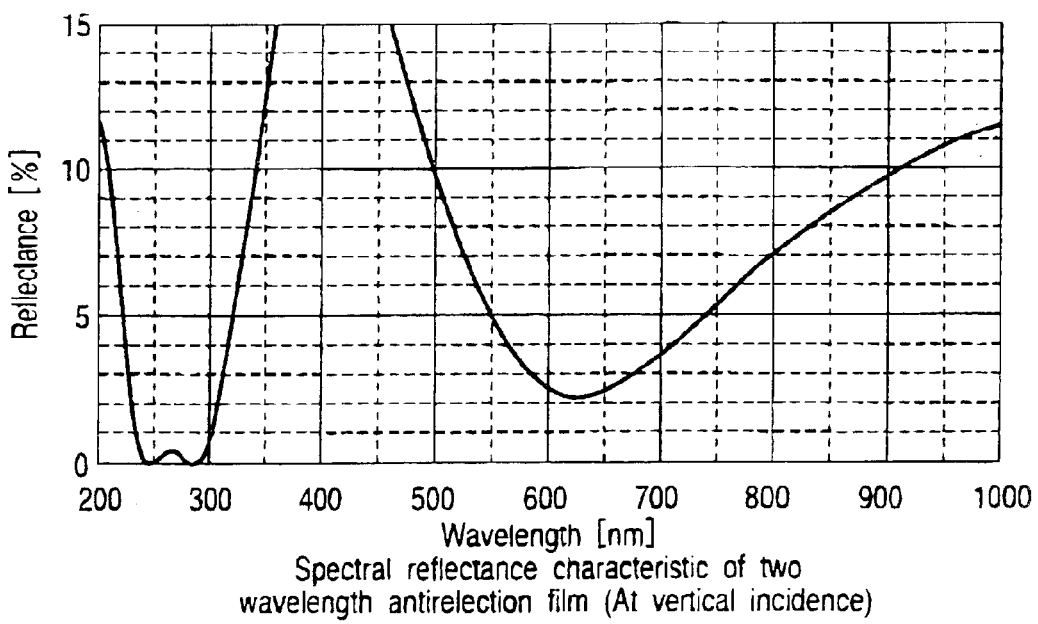
FIG. 11 is a figure showing the spectral reflectance characteristic of a two-wavelength antireflection film according to the eighth embodiment of the present invention.

FIG. 11 shows spectral reflectance characteristic for the two wavelength antireflection film made for trial purposes with the configuration shown in (A) of Table 4, when the incident angle of light is assumed to be 0° (vertical). By changing the incident angle of the light, the curve (a) of FIG. 14 is obtained as a result of simulating the numerical value how the reflectance of the light of design main wavelength (248 nm) is changed.

As is clear from FIG. 11, it becomes possible to perform antireflection because reflectance becomes small in two-wavelength region in the vicinity of 248 nm and within the range of 650 nm to 800 nm. It is also clear that the reflection of design main wavelength (248 nm) is small in the range of 0° to 70° in incident angle of light as shown in curve (a) of FIG. 14. Therefore, if two wavelength antireflection film configured with thin films 2, 3; 4, and 5 of the eighth embodiment is formed on the substrate 1 of quartz glass which is transparent from the deep-ultraviolet region to the near-infrared region, high transmittance can be achieved for light in the deep-ultraviolet region in the vicinity of design main wavelength (248 nm) and light in the visible region used for auto focus within the range of 550 nm to 650 nm The film material and the film thickness of each of thin films 2, 3, 4, and 5 of two-wavelength antireflection films configured as FIG. 1 is shown in (B) of Table 4

In this case, the film materials of thin films 2, 3, 4, and 5, each of which forms each layer, are as follows. The mixture of $Al_2O_3$ and $La_2O_3$ with the middle refractive index material is used to thin film 2 of the first layer and thin film 4 of the third layer from the substrate 1. Specifically, Substance M2 made by the Merck, which is the mixture of $Al_2O_3$ and $La_2O_3$ whose refractive index is about 1.8 in design main wavelength (248 nm in the deep-ultraviolet region) is used. $MgF_2$ whose refractive index in design main wavelength (248 nm in the deep-ultraviolet region) is the low refractive index of about 1.4 is used to thin film 3 in the second layer and thin film 5 in the fourth layer from the substrate 1 similar to the first embodiment. Each film thickness of these thin films 2, 3, 4, and 5 is shown in (B) of Table 4.

Figure 12:
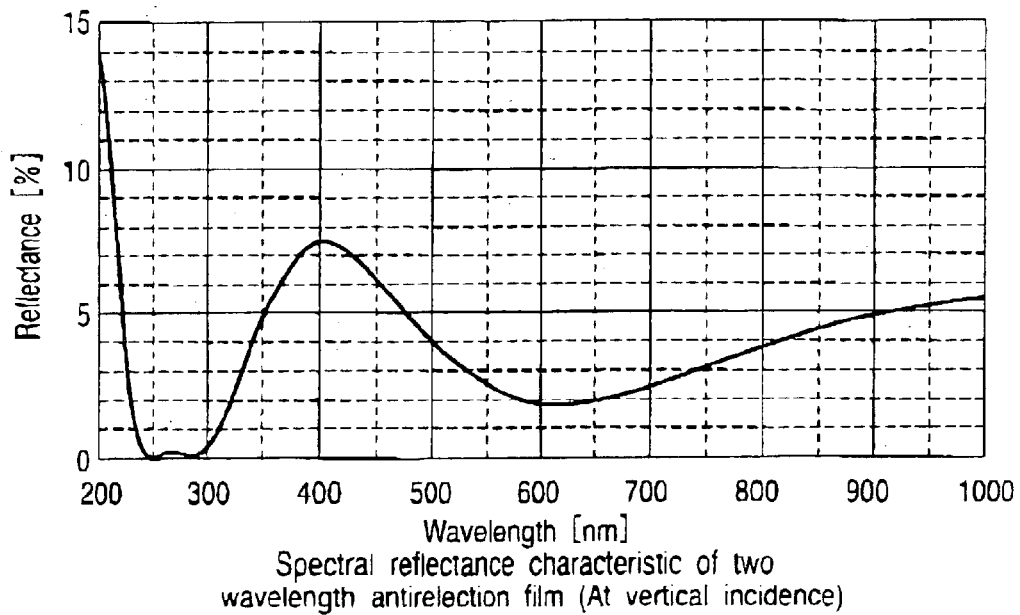
FIG. 12 is a figure showing the spectral reflectance characteristic of a two-wavelength antireflection film according to the ninth embodiment of the present invention.

FIG. 12 shows spectral reflectance characteristic for the two wavelength antireflection film made for trial purposes with the configuration shown in (B) of Table 4, when the incident angle of light is assumed to be 0° (vertical). By changing the incident angle of the light, the curve (b) of FIG. 14 is obtained as a result of simulating the numerical value how the reflectance of the light of design main wavelength (248 nm) is changed.

As is clear from FIG. 12, it becomes possible to perform antireflection because reflectance becomes small in two-wavelength region within the range of the vicinity of 248 nm and 550 nm to 800 nm. It is also clear that the reflection of design main wavelength (248 nm) is small in the range of 0° to 70° in incident angle of light as shown in curve (b) of FIG. 14. Therefore, high transmittance can be achieved for light in the visible region similarly used for auto focus within the range of light in the deep-ultraviolet region in the vicinity of design main wavelength (248 nm) and 550 nm to 650 nm when having described in the eighth embodiment.

(Tenth Embodiment)

The schematic configuration of the two-wavelength antireflection film according to the tenth embodiment is similar to that in FIG. 1, and the explanation will be described by using FIG. 1.

The film material and the film thickness of each of thin films 2, 3, 4, and 5 of two-wavelength antireflection films configured as FIG. 1 is shown in (C) of Table 4.

The film materials of thin films 2, 3, 4, and 5, each of which forms each layer, are as follows. Substance M3 made by the Merck, which is the mixture of $Al_2O_3$ and $La_2O_3$ whose refractive index in design main wavelength (248 nm in the deep-ultraviolet region) is about 1.95, is used is used to thin film 2 of the first layer and thin film 4 of the third layer from the substrate 1. $MgF_2$ whose refractive index in design main wavelength (248 nm in the deep-ultraviolet region) is the low refractive index of about 1.4 is used to thin film 3 in the second layer and thin film 5 in the fourth layer from the substrate 1. Each film thickness of these thin films 2, 3, 4, and 5 is shown in (C) of Table 4.

Figure 13:
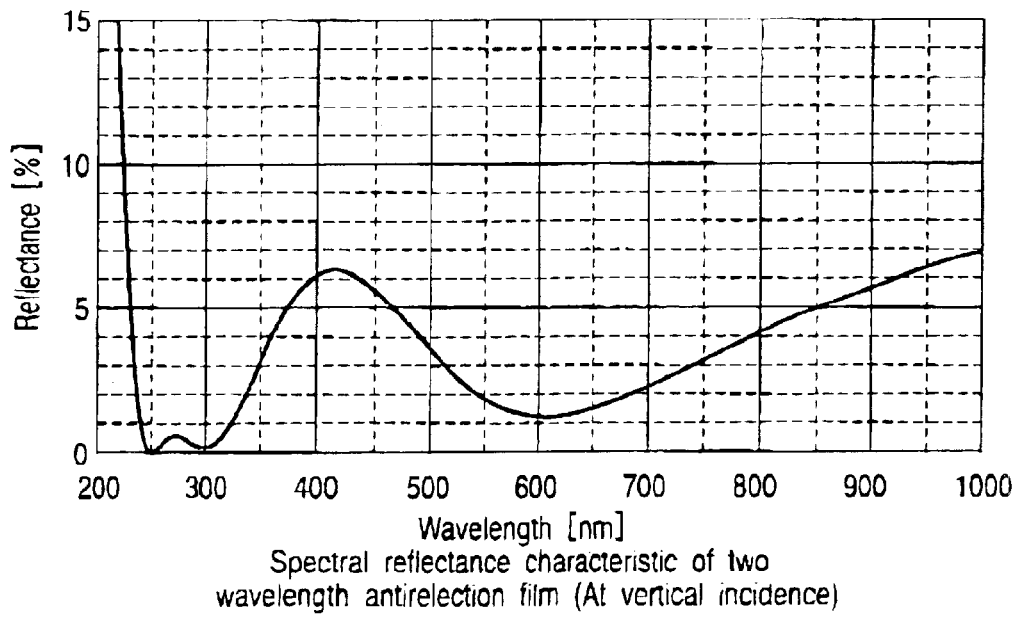
FIG. 13 is a figure showing the spectral reflectance characteristic of a two-wavelength antireflection film according to the tenth embodiment of the present invention.

FIG. 13 shows spectral reflectance characteristic for the two wavelength antireflection film made for trial purposes with the configuration shown in (C) of Table 4, when the incident angle of light is assumed to be 0° (vertical). By changing the incident angle of the light, the curve (c) of FIG. 14 is obtained as a result of simulating the numerical value how the reflectance of the light of design main wavelength (248 nm) is changed.

As is clear from FIG. 13, it becomes possible to perform antireflection because reflectance becomes small in two-wavelength region in the vicinity of 248 nm and within the range of 650 nm to 800 nm. It is also clear that the reflection of design main wavelength (248 nm) is small in the range of 0° to 70° in incident angle of light as shown in curve (c) of FIG. 14. Therefore, high transmittance can be achieved for light from the visible region used for auto focus in the vicinity or the range of light in the deep-ultraviolet region in the vicinity of design main wavelength (248 nm) and 550 nm to 650 nm to the near-infrared region similar to that described in the eighth embodiment.

In the above-mentioned first to tenth embodiment, MgF2 as the low refraction material and $Al_2O_3$ or the mixture of $Al_2O_3$ and $La_2O_3$ as the middle refractive index material is used. It is not limited to this, even when material having similar refractive index to these materials such as a plurality of components selected from group of $MgF_2$, $SiO_2$, NaF, LiF, and mixture thereof or compound thereof as the low refractive index material and material one or more components selected from group of $Al_2O_3$, $LaF_3$, $NdF_3$, $YF_3$, $La_2O_3$, and mixture thereof or compound thereof as the middle refractive index material is used, and advantages of above mentioned embodiments can be expected.

(Eleventh Embodiment)

The schematic configuration of the two-wavelength anti-reflection film according to the eleventh embodiment is similar to that in FIG. 1, and the explanation will be described by using FIG. 1.

The film material and the film thickness of each of thin films 2, 3, 4, and 5 of two-wavelength antireflection films configured as FIG. 1 is shown in (A) of Table 5. Table 5 collectively shows the film material and the film thickness corresponding to the fourth and fifth embodiments ((A) and (B)) as described later.

TABLE 5

| | B | | C | |
|---|---|---|---|---|
| | Substrate 1 | | | |
| | Quartz glass | | Quartz glass | |
| | Design wavelength λ | | | |
| | 248 nm | | 248 nm | |
| | Film material | Film thickness (×λ) | Film material | Film thickness (×λ) |
| Thin film 2 | $Al_2O_3$ + $La_2O_3$ (Substance M2) | 0.64 | $Al_2O_3$ + $La_2O_3$ (Substance M2) | 0.50 |
| Thin film 3 | $SiO_2$ | 0.11 | $SiO_2$ | 0.19 |
| Thin film 4 | $Al_2O_3$ + $La_2O_3$ (Substance M2) | 0.37 | $Al_2O_3$ + $La_2O_3$ (Substance M2) | 0.32 |
| Thin film 5 | $MgF_2$ | 0.28 | $SiO_2$ | 0.28 |

The film materials of thin films 2, 3, 4, and 5, each of which forms each layer, are as follows. Substance M2 made by the Merck, which is the mixture of $Al_2O_3$ and $La_2O_3$ whose refractive index is about 1.8 in design main wavelength (248 nm in the deep-ultraviolet region) is used to thin film 2 of the first layer and thin film 4 of the third layer from the substrate 1. $SiO_2$ whose refractive index in design main wavelength (248 nm in the deep-ultraviolet region) is the low refractive index of about 1.5, is used to thin film 3 in the second layer from the substrate 1. $MgF_2$ whose refractive index in design main wavelength (248 nm in the deep-ultraviolet region) is the low refractive index of about 1.4 is used to thin film 5 in the fourth layer front the substrate 1. Each film thickness of these thin films 2, 3, 4, and 5 is shown in (A) of Table 5.

FIG. 15 shows spectral reflectance characteristic for the two wavelength antireflection film made for trial purposes with the configuration shown in (A) of Table 5, when the incident angle of light is assumed to be 0° (vertical). By changing the incident angle of the light, the curve (d) of FIG. 14 is obtained as a result of simulating the numerical value how the reflectance of the light of design main wavelength (248 nm) is changed.

As is clear from FIG. 15, it becomes possible to perform antireflection because reflectance becomes small in two-wavelength region in the vicinity of 248 nm and within the range of 650 nm to 800 nm. It is also clear that the reflection of design main wavelength (248 nm) is small in the range of 0° to 70° in incident angle of light as shown in curve (d) of FIG. 14. As a result, a similar advantage to the first embodiment can be expected.

(Twelfth Embodiment)

The schematic configuration of the two-wavelength anti-reflection film according to the twelfth embodiment is similar to that in FIG. 1, and the explanation will be described by using FIG. 1.

The film material and the film thickness of each of thin films 2, 3, 4, and 5 of two-wavelength antireflection films configured as FIG. 1 is shown in (B) of Table 5.

The film materials of thin films 2, 3, 4, and 5, each of which forms each layer, are as follows. Substance M2 made by the Merck, which is the mixture of $Al_2O_3$ and $La_2O_3$ whose refractive index is about 1.8 in design main wavelength (248 nm in the deep-ultraviolet region) is used to thin film 2 of the first layer and thin film 4 of the third layer from the substrate 1. $SiO_2$ whose refractive index in design main wavelength (248 nm in the deep-ultraviolet region) is the low refractive index of about 1.5, is used to thin film 3 in the second layer and thin film 5 in the fourth layer from the substrate 1. Each film thickness of these thin films 2, 3, 4, and 5 is shown in (B) of Table 5.

Figure 16:
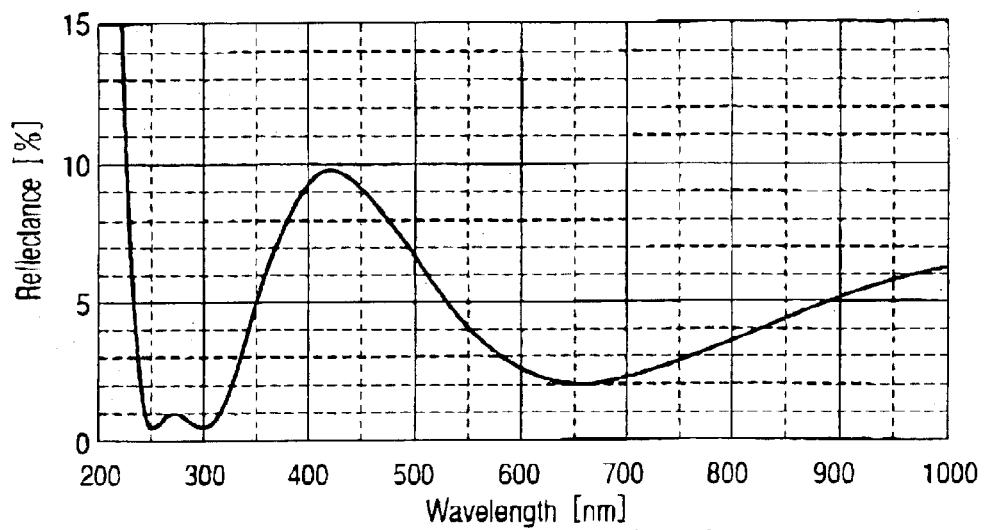
FIG. 16 is a figure showing the spectral reflectance characteristic of a two-wavelength antireflection film according to the twelfth embodiment of the present invention.

FIG. 16 shows spectral reflectance characteristic for the two wavelength antireflection film made for trial purposes with the configuration shown in (B) of Table 5, when the incident angle of light is assumed to be 0° (vertical). By changing the incident angle of the light, the curve (e) of FIG. 14 is obtained as a result of simulating the numerical value how the reflectance of the light of design main wavelength (248 nm) is changed.

As is clear from FIG. 16, it becomes possible to perform antireflection because reflectance becomes small in two-wavelength region in the vicinity of 248 nm and within the range of 650 nm to 800 nm. It is also clear that the reflection of design main wavelength (248 mm) is small in the range of 0° to 70° in incident angle of light as shown in curve (e) of FIG. 14. As a result, a similar advantage to the first embodiment can be expected.

FIRST COMPARISON EXAMPLE

Next, two-wavelength antireflection film of the film configuration and the design value indicated in Table 6 as a comparison example with two-wavelength antireflection film by each embodiment mentioned above has been examined. The schematic configuration of the two-wavelength antireflection film of this case is similar to that in FIG. 1, and the explanation will be described by using FIG. 1.

TABLE 6

| | Substrate 1 Quartz glass Design wavelength λ 248 nm | |
|---|---|---|
| Layer number (from substrate) | Film material | Film thickness (×λ) |
| Thin film 2 | $Al_2O_3 + La_2O_3$ (Substance M2) | 0.96 |
| Thin film 3 | $MgF_2$ | 0.35 |
| Thin film 4 | $Al_2O_3 + La_2O_3$ (Substance M2) | 0.12 |
| Thin film 5 | $MgF_2$ | 0.29 |

In the above-mentioned configuration, substance M2 made by the Merck, which is the mixture of $Al_2O_3$ and $La_2O_3$ whose refractive index in design main wavelength (248 nm in the deep-ultraviolet region) is about 1.8, is used to thin film 2 of the first layer and thin film 4 of the third layer from the substrate 1. $MgF_2$ whose refractive index in design main wavelength (248 nm in the deep-ultraviolet region) is the low refractive index of about 1.4 is used to thin film 3 in the second layer and thin film 5 in the fourth layer from the substrate 1 similar to the second embodiment. Each film thickness of these thin films 2, 3, 4, and 5 is shown in Table 6.

Figure 17:
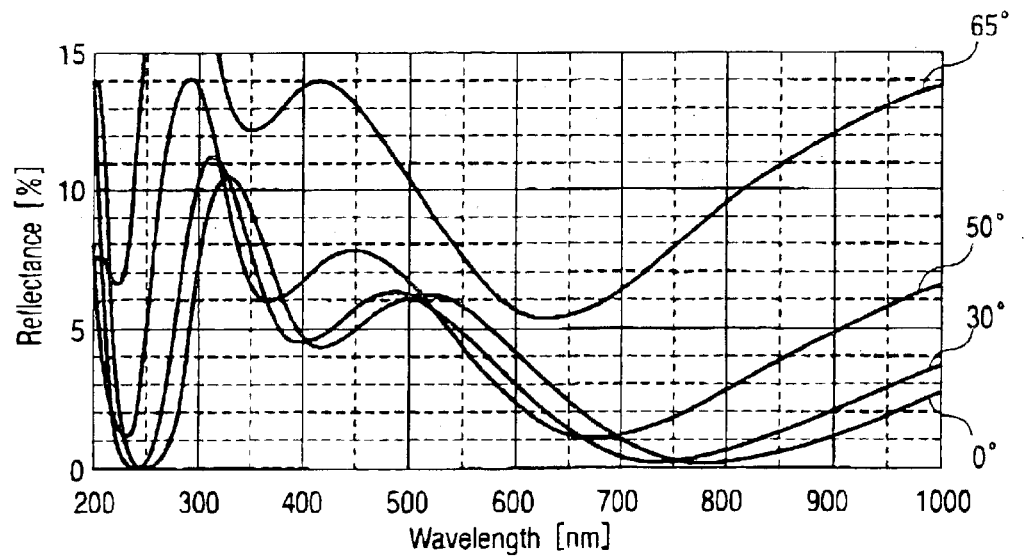
FIG. 17 is a figure showing the spectral reflectance characteristic of a two-wavelength antireflection film in the first comparison example to explain the present invention.

FIG. 17 shows each spectral reflectance characteristic for the two wavelength antireflection film made for trial purposes with the configuration shown in Table 6, when changing the incident angle of the light to 0°, 30°, 50°, and 65°, respectively. By changing the incident angle of the light, the curve (d) of FIG. 5 is obtained as a result of simulating the numerical value how the reflectance of the light of design main wavelength (248 nm) is changed.

As is clear from FIG. 17, it becomes possible to perform antireflection because reflectance becomes small in two-wavelength region in the vicinity of 248 nm and within the range of 650 nm to 800 nm when the incident angle of light is 0° and 30°. However, reflectance in the vicinity of 248 nm becomes large as the incident angle of light becomes large. Especially, as shown in curve (d) of FIG. 5, when the incident angle becomes 55° or more, the function as the antireflection film is not obtained at all because the reflectance of 248 nm becomes larger than the substrate on which the film is not coated as shown in curve (e) of FIG. 5.

SECOND COMPARISON EXAMPLE

Next, two-wavelength antireflection film of the film configuration and the design value indicated in Table 7 as other comparison example with two-wavelength antireflection film by each embodiment mentioned above has been examined. The schematic configuration of the two-wavelength antireflection film of this case is similar to that in FIG. 1, and the explanation will be described by using FIG. 1.

TABLE 7

| | Substrate 1 Quartz glass Design wavelength λ 248 nm | |
|---|---|---|
| Layer number (from substrate) | Film material | Film thickness (×λ) |
| Thin film 2 | $Al_2O_3 + La_2O_3$ (Substance M2) | 0.47 |
| Thin film 3 | $MgF_2$ | 0.35 |
| Thin film 4 | $Al_2O_3 + La_2O_3$ (Substance M2) | 0.13 |
| Thin film 5 | $MgF_2$ | 0.29 |

Substance M2 made by the Merck, which is the mixture of $Al_2O_3$ and $La_2O_3$ whose refractive index in design main wavelength (248 nm in the deep-ultraviolet region) is about 1.8, is used to thin film 2 of the first layer and thin film 4 of the third layer from the substrate 1. $MgF_2$ whose refractive index in design main wavelength (248 nm in the deep-ultraviolet region) is the low refractive index or about 1.4 is used to thin film 3 in the second layer and thin film 5 in the fourth layer from the substrate 1. Each film thickness of these thin films 2, 3, 4, and 5 is shown in Table 7.

FIG. 18 shows spectral reflectance characteristic for the two wavelength antireflection film made for trial purposes with the configuration shown in Table 7, when the incident angle of light is assumed to be 0° (vertical). By changing the incident angle of the light, the curve (f) of FIG. 14 is obtained as a result of simulating the numerical value how the reflectance of the light of design main wavelength (248 nm) is changed.

As is clear from FIG. 18, it becomes possible to perform antireflection because reflectance becomes small in two-wavelength region in the vicinity of 248 nm and within the range of 650 nm to 800 nm when the incident angle of light is 0°. However, when the incident angle becomes large, the reflectance of 248 nm abruptly becomes large as shown in curve (f) of FIG. 14. Especially, when the incident angle becomes 65° or more, the reflectance of 248 nm becomes large, and becomes larger than the reflectance of the substrate on which the film is not coated as shown in curve (g) of FIG. 14. The function as the antireflection film is not obtained at all.

Next, the objective lens on which two-wavelength antireflection film mentioned above is actually coated on the surface of the lens will be explained.

(Thirteenth Embodiment)

Figure 19:
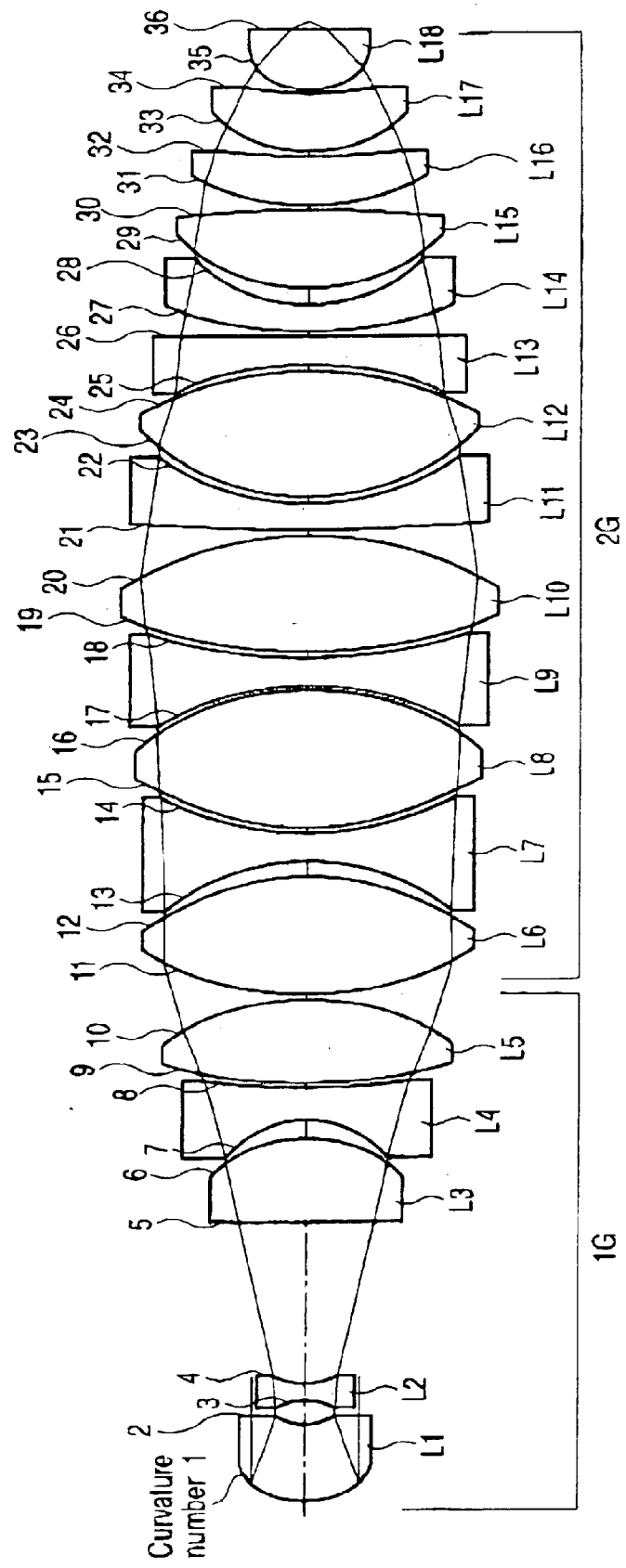
FIG. 19 is a figure showing a schematic configuration of the objective lens used for the thirteenth embodiment of the present invention.

FIG. 19 is a figure showing a schematic configuration of the objective lens applied to the thirteenth embodiment of the present invention.

The objective lens is used for an optical equipment which observes by the light of wavelength of the ultra-violet region of 300 nm or less and has the mechanism to focus (auto focus) by the light in the wavelength region from a visible region to the near-infrared region. Specifically, light of 248±5 nm in the deep-ultraviolet region as wavelength used for the observation and light of 785 nm in the near-infrared region as wavelength used for auto focus are applied.

The objective lens has the first lens group 1G and the second lens group G2 arranged between the first lens group 1G and the object as shown in FIG. 19. The first lens group 1G has five single lenses L1 to L5 which include positive lens and negative lens with the different medium and has negative power as a whole. The second lens group 2G has thirteen single lenses L6 to LIB which include positive lens and negative lens with the different medium. In the first and second lens group 1G and 2G, the air interval is provided between a positive lens and negative lens. Tables 8 to 11 show the angle of the light which is incident (emitted) to (from) the normal of the lens, reflectance and the transmittance, etc. corresponding thereto, which are obtained when two wavelength antireflection film explained in derail in the seventh embodiment is coated to each lens surface of each single lens L1 to L18 for each of NA=0.9, 0.8, 0.7, and 0.5 of such an objective lens, and the lens data of each single lens L1 to L18 (curvature, thickness, interval, and material name).

The angle of the light which is incident (emitted) to (from) the normal of the lens is an angle r of the light which is incident (emitted) to (from) normal h of the objective lens L as shown in FIG. 20.

Reflectance and transmittance are obtained from the value of the incident angle obtained as mentioned above.

TABLE 8

| Surface | | number | Curvature | Thickness and Internval | Material | Incident Angle | Reflectance | Transmittance |
|---|---|---|---|---|---|---|---|---|
| L₁ | | 1 | 2.562 | 2.562 | Quartz glass | 40 | 0.476 | 0.995 |
| | | 2 | 2.11 | 0.7 | | 23 | 0.421 | 0.996 |
| L₂ | | 3 | −2.503 | 0.7 | Fluorite glass | 31 | 0.329 | 0.997 |
| | | 4 | 3.929 | 5.212314 | | 29 | 0.057 | 0.999 |
| L₃ | | 5 | INF | 2.786 | Fluorite glass | 13 | 1.091 | 0.989 |
| | | 6 | −4.1 | 0.585821 | | 47 | 0.68 | 0.993 |
| L₄ | | 7 | −3.179 | 1 | Quartz glass | 61 | 10.316 | 0.897 |
| | | 8 | 13.25 | 0.205879 | | 53 | 10823 | 0.982 |
| L₅ | | 9 | 14.51 | 2.792 | Fluorite glass | 53 | 1.787 | 0.982 |
| | | 10 | −8.069 | 0.135719 | | 16 | 0.278 | 0.997 |
| L₆ | | 11 | 9.175 | 4.016 | Fluorite glass | 43 | 0.959 | 0.990 |
| | | 12 | −8.107 | 0.473387 | | 59 | 2.554 | 0.974 |
| L₇ | | 13 | −6.806 | 1 | Quartz glass | 65 | 7.46 | 0.925 |
| | | 14 | 9.394 | 0.205775 | | 54 | 1.668 | 0.983 |
| L₈ | | 15 | 9.73 | 4.65 | Fluorite glass | 54 | 1.709 | 0.983 |
| | | 16 | −7.998 | 0.105412 | | 53 | 1.314 | 0.987 |
| L₉ | | 17 | −8.397 | 1 | Quartz glass | 50 | 0.958 | 0.990 |
| | | 18 | 13.99 | 0.1 | | 40 | 0.611 | 0.994 |
| L₁₀ | | 19 | 12.513 | 4.035695 | Fluorite glass | 43 | 0.968 | 0.990 |
| | | 20 | −10.732 | 0.1 | | 39 | 0.852 | 0.991 |
| L₁₁ | | 21 | 35.892 | 1 | Quartz glass | 2 | 0.079 | 0.999 |
| | | 22 | 6.835 | 0.201239 | | 52 | 1.419 | 0.986 |
| L₁₂ | | 23 | 6.916 | 4.203 | Fluorite glass | 52 | 1.359 | 0.986 |
| | | 24 | −10.627 | 0.2075 | | 51 | 1.626 | 0.984 |
| L₁₃ | | 25 | −10.072 | 0.96 | Quartz glass | 52 | 1.71 | 0.983 |
| | | 26 | 101.798 | 0.1 | | 7 | 1.232 | 0.988 |
| L₁₄ | | 27 | 10.53 | 0.9 | Quartz glass | 12 | 0.037 | 1.000 |
| | | 28 | 4.509 | 0.527319 | | 62 | 9.5 | 0.905 |
| L₁₅ | | 29 | 5.379 | 2.576 | Fluorite glass | 52 | 1.308 | 0.987 |
| | | 30 | −51.505 | 0.1 | | 16 | 0.888 | 0.991 |
| L₁₆ | | 31 | 6.736 | 1.742 | Fluorite glass | 15 | 0.157 | 0.998 |
| | | 32 | 17.567 | 0.1 | | 12 | 0.814 | 0.992 |
| L₁₇ | | 33 | 4.099 | 1.818 | Fluorite glass | 15 | 0.656 | 0.993 |
| | | 34 | 9.003 | 0.10016 | | 21 | 0.357 | 0.996 |
| L₁₈ | | 35 | 1.883 | 1.872 | Quartz glass | 17 | 0.27 | 0.997 |
| | | 36 | 5.293 | 0.262779 | | 58 | 2.765 | 0.972 |

Transmittance of the objective lens at NA = 0.9:0.537

TABLE 9

| Surface number | | Curvature | Thickness and Internval | Material | Incident Angle | Reflectance | Transmittance |
|---|---|---|---|---|---|---|---|
| $L_1$ | 1 | 2.562 | 2.562 | Quartz glass | 35 | 0.774 | 0.993 |
| | 2 | 2.11 | 0.7 | | 21 | 0.195 | 0.998 |
| $L_2$ | 3 | −2.503 | 0.7 | Fluorite glass | 26 | 0.091 | 0.999 |
| | 4 | 3.929 | 5.212314 | | 26 | 0.122 | 0.999 |
| $L_3$ | 5 | INF | 2.786 | Fluorite glass | 12 | 1.12 | 0.989 |
| | 6 | −4.1 | 0.585821 | | 41 | 0.702 | 0.993 |
| $L_4$ | 7 | −3.179 | 1 | Quartz glass | 53 | 2.825 | 0.972 |
| | 8 | 13.25 | 0.205879 | | 44 | 0.541 | 0.995 |
| $L_5$ | 9 | 14.51 | 2.792 | Fluorite glass | 43 | 0.435 | 0.996 |
| | 10 | −8.069 | 0.135719 | | 15 | 0.019 | 1.000 |
| $L_6$ | 11 | 9.175 | 4.016 | Fluorite glass | 36 | 0.616 | 0.994 |
| | 12 | −8.107 | 0.473387 | | 46 | 1.128 | 0.989 |
| $L_7$ | 13 | −6.806 | 1 | Quartz glass | 51 | 1.157 | 0.988 |
| | 14 | 9.394 | 0.205775 | | 41 | 0.845 | 0.992 |
| $L_8$ | 15 | 9.73 | 4.65 | Fluorite glass | 41 | 0.82 | 0.992 |
| | 16 | −7.998 | 0.105412 | | 42 | 0.931 | 0.991 |
| $L_9$ | 17 | −8.397 | 1 | Quartz glass | 40 | 0.881 | 0.991 |
| | 18 | 13.99 | 0.1 | | 31 | 0.079 | 0.999 |
| $L_{10}$ | 19 | 12.513 | 4.035695 | Fluorite glass | 33 | 0.196 | 0.998 |
| | 20 | −10.732 | 0.1 | | 31 | 0.329 | 0.997 |
| $L_{11}$ | 21 | 35.892 | 1 | Quartz glass | 2 | 1.029 | 0.990 |
| | 22 | 6.835 | 0.201239 | | 42 | 0.77 | 0.992 |
| $L_{12}$ | 23 | 6.916 | 4.203 | Fluorite glass | 42 | 0.77 | 0.992 |
| | 24 | −10.627 | 0.2075 | | 41 | 0.648 | 0.994 |
| $L_{13}$ | 25 | −10.072 | 0.96 | Quartz glass | 41 | 0.686 | 0.993 |
| | 26 | 101.798 | 0.1 | | 6 | 1.25 | 0.988 |
| $L_{14}$ | 27 | 10.53 | 0.9 | Quartz glass | 10 | 0.178 | 0.998 |
| | 28 | 4.509 | 0.527319 | | 49 | 0.881 | 0.991 |
| $L_{15}$ | 29 | 5.379 | 2.576 | Fluorite glass | 42 | 0.77 | 0.992 |
| | 30 | −51.505 | 0.1 | | 15 | 1.032 | 0.990 |
| $L_{16}$ | 31 | 6.736 | 1.742 | Fluorite glass | 12 | 0.021 | 1.000 |
| | 32 | 17.567 | 0.1 | | 12 | 0.912 | 0.991 |
| $L_{17}$ | 33 | 4.099 | 1.818 | Fluorite glass | 12 | 0.333 | 0.997 |
| | 34 | 9.003 | 0.10016 | | 20 | 0.465 | 0.995 |
| $L_{18}$ | 35 | 1.883 | 1.872 | Quartz glass | 13 | 0.68 | 0.993 |
| | 36 | 5.293 | 0.262779 | | 50 | 0.893 | 0.991 |

Transmittance of the objective lens at NA = 0.8:0.777

TABLE 10

| Surface number | | Curvature | Thickness and Internval | Material | Incident Angle | Reflectance | Transmittance |
|---|---|---|---|---|---|---|---|
| $L_1$ | 1 | 2.562 | 2.562 | Quartz glass | 30 | 00.604 | 0.994 |
| | 2 | 2.11 | 0.7 | | 19 | 0.04 | 1.000 |
| $L_2$ | 3 | −2.503 | 0.7 | Fluorite glass | 23 | 0.04 | 1.000 |
| | 4 | 3.929 | 5.212314 | | 23 | 0.235 | 0.998 |
| $L_3$ | 5 | INF | 2.786 | Fluorite glass | 11 | 1.15 | 0.989 |
| | 6 | −4.1 | 0.585821 | | 36 | 0.788 | 0.992 |
| $L_4$ | 7 | −3.179 | 1 | Quartz glass | 46 | 0.59 | 0.994 |
| | 8 | 13.25 | 0.205879 | | 37 | 0.155 | 0.998 |
| $L_5$ | 9 | 14.51 | 2.792 | Fluorite glass | 36 | 0.134 | 0.999 |
| | 10 | −8.069 | 0.135719 | | 13 | 0.023 | 1.000 |
| $L_6$ | 11 | 9.175 | 4.016 | Fluorite glass | 30 | 0.151 | 0.998 |
| | 12 | −8.107 | 0.473387 | | 38 | 0.65 | 0.990 |
| $L_7$ | 13 | −6.806 | 1 | Quartz glass | 42 | 0.959 | 0.994 |
| | 14 | 9.394 | 0.205775 | | 33 | 0.227 | 0.990 |
| $L_8$ | 15 | 9.73 | 4.65 | Fluorite glass | 33 | 0.196 | 0.998 |
| | 16 | −7.998 | 0.105412 | | 34 | 0.527 | 0.995 |
| $L_9$ | 17 | −8.397 | 1 | Quartz glass | 33 | 0.411 | 0.996 |
| | 18 | 13.99 | 0.1 | | 25 | 0.135 | 0.999 |
| $L_{10}$ | 19 | 12.513 | 4.035695 | Fluorite glass | 27 | 0.064 | 0.999 |
| | 20 | −10.732 | 0.1 | | 26 | 0.046 | 1.000 |
| $L_{11}$ | 21 | 35.892 | 1 | Quartz glass | 1 | 1.189 | 0.988 |
| | 22 | 6.835 | 0.201239 | | 35 | 0.728 | 0.993 |
| $L_{12}$ | 23 | 6.916 | 4.203 | Fluorite glass | 35 | 0.709 | 0.993 |
| | 24 | −10.627 | 0.2075 | | 33 | 0.122 | 0.999 |
| $L_{13}$ | 25 | −10.072 | 0.96 | Quartz glass | 34 | 0.143 | 0.999 |
| | 26 | 101.798 | 0.1 | | 5 | 1.268 | 0.987 |
| $L_{14}$ | 27 | 10.53 | 0.9 | Quartz glass | 9 | 0.443 | 0.996 |
| | 28 | 4.509 | 0.527319 | | 40 | 0.725 | 0.993 |
| $L_{15}$ | 29 | 5.379 | 2.576 | Fluorite glass | 34 | 0.698 | 0.993 |
| | 30 | −51.505 | 0.1 | | 13 | 1.091 | 0.989 |

TABLE 10-continued

| Surface number | | Curvature | Thickness and Internval | Material | Incident Angle | Reflectance | Transmittance |
|---|---|---|---|---|---|---|---|
| $L_{16}$ | 31 | 6.736 | 1.742 | Fluorite glass | 9 | 0.105 | 0.999 |
|  | 32 | 17.567 | 0.1 |  | 11 | 1.146 | 0.989 |
| $L_{17}$ | 33 | 4.099 | 1.818 | Fluorite glass | 9 | 0.056 | 0.999 |
|  | 34 | 9.003 | 0.10016 |  | 17 | 0.75 | 0.993 |
| $L_{18}$ | 35 | 1.883 | 1.872 | Quartz glass | 10 | 0.573 | 0.994 |
|  | 36 | 5.293 | 0.262779 |  | 42 | 0.288 | 0.997 |

Transmittance of the objective lens at NA = 0.7:0.842

TABLE 11

| Surface number | | Curvature | Thickness and Internval | Material | Incident Angle | Reflectance | Transmittance |
|---|---|---|---|---|---|---|---|
| $L_1$ | 1 | 2.562 | 2.562 | Quartz glass | 21 | 0.027 | 1.000 |
|  | 2 | 2.11 | 0.7 |  | 14 | 0.277 | 0.997 |
| $L_2$ | 3 | −2.503 | 0.7 | Fluorite glass | 16 | 0.436 | 0.996 |
|  | 4 | 3.929 | 5.212314 |  | 17 | 0.657 | 0.993 |
| $L_3$ | 5 | INF | 2.786 | Fluorite glass | 8 | 1.215 | 0.988 |
|  | 6 | −4.1 | 0.585821 |  | 25 | 0.091 | 0.999 |
| $L_4$ | 7 | −3.179 | 1 | Quartz glass | 32 | 0.637 | 0.994 |
|  | 8 | 13.25 | 0.205879 |  | 25 | 0.433 | 0.996 |
| $L_5$ | 9 | 14.51 | 2.792 | Fluorite glass | 24 | 0.474 | 0.995 |
|  | 10 | −8.069 | 0.135719 |  | 10 | 1.282 | 0.987 |
| $L_6$ | 11 | 9.175 | 4.016 | Fluorite glass | 20 | 0.255 | 0.997 |
|  | 12 | −8.107 | 0.473387 |  | 25 | 0.071 | 0.999 |
| $L_7$ | 13 | −6.806 | 1 | Quartz glass | 27 | 0.051 | 0.999 |
|  | 14 | 9.394 | 0.205775 |  | 21 | 0.231 | 0.998 |
| $L_8$ | 15 | 9.73 | 4.65 | Fluorite glass | 21 | 0.29 | 0.997 |
|  | 16 | −7.998 | 0.105412 |  | 23 | 0.074 | 0.999 |
| $L_9$ | 17 | −8.397 | 1 | Quartz glass | 22 | 0.119 | 0.999 |
|  | 18 | 13.99 | 0.1 |  | 16 | 0.693 | 0.993 |
| $L_{10}$ | 19 | 12.513 | 4.035695 | Fluorite glass | 17 | 0.568 | 0.994 |
|  | 20 | −10.732 | 0.1 |  | 17 | 0.28 | 0.997 |
| $L_{11}$ | 21 | 35.892 | 1 | Quartz glass | 1 | 0.189 | 0.998 |
|  | 22 | 6.835 | 0.201239 |  | 23 | 0.034 | 1.000 |
| $L_{12}$ | 23 | 6.916 | 4.203 | Fluorite glass | 23 | 0.034 | 1.000 |
|  | 24 | −10.627 | 0.2075 |  | 22 | 0.395 | 0.996 |
| $L_{13}$ | 25 | −10.072 | 0.96 | Quartz glass | 22 | 0.326 | 0.997 |
|  | 26 | 101.798 | 0.1 |  | 3 | 1.28 | 0.987 |
| $L_{14}$ | 27 | 10.53 | 0.9 | Quartz glass | 6 | 0.844 | 0.992 |
|  | 28 | 4.509 | 0.527319 |  | 26 | 0.144 | 0.999 |
| $L_{15}$ | 29 | 5.379 | 2.576 | Fluorite glass | 22 | 0.035 | 1.000 |
|  | 30 | −51.505 | 0.1 |  | 9 | 1.197 | 0.988 |
| $L_{16}$ | 31 | 6.736 | 1.742 | Fluorite glass | 6 | 0.6 | 0.994 |
|  | 32 | 17.567 | 0.1 |  | 8 | 1.11 | 0.989 |
| $L_{17}$ | 33 | 4.099 | 1.818 | Fluorite glass | 6 | 0.274 | 0.997 |
|  | 34 | 9.003 | 0.10016 |  | 12 | 1.015 | 0.990 |
| $L_{18}$ | 35 | 1.883 | 1.872 | Quartz glass | 6 | 0.018 | 1.000 |
|  | 36 | 5.293 | 0.262779 |  | 28 | 0.476 | 0.995 |

Transmittance of the objective lens at NA = 0.5:0.850

Thus, the transmittance at wavelength 248 nm and NA=0.9 shown in Table 8 becomes 53.8%. Similarly, the transmittance at wavelength 248 nm and NA=0.8 shown in Table 9 becomes 77.7%. The transmittance at wavelength 248 nm and NA=0.7 shown in Table 10 becomes 84.2%. The transmittance at wavelength 248 nm and NA=0.5 shown in Table 11 becomes 85%.

On the other hand, Tables 12 to 15 show the angle of the light which is incident (emitted) to (from) the normal of the lens, reflectance and the transmittance, etc. corresponding thereto, which are obtained when two wavelength antireflection film explained in detail in the first comparison example is provided to each lens surface of each single lens L1 to L18 for each of NA=0.9, 0.8, 0.7, and 0.5 of such an objective lens, and the lens data of each single lens L1 to L18 (curvature, thickness, interval, and material name).

TABLE 12

| Surface number | | Curvature | Thickness and Internval | Material | Incident Angle | Reflectance | Transmittance |
|---|---|---|---|---|---|---|---|
| $L_1$ | 1 | 2.562 | 2.562 | Quartz glass | 40 | 12.006 | 0.880 |
| | 2 | 2.11 | 0.7 | | 23 | 4.17 | 0.958 |
| $L_2$ | 3 | −2.503 | 0.7 | Fluorite glass | 31 | 3.548 | 0.965 |
| | 4 | 3.929 | 5.212314 | | 29 | 0.916 | 0.991 |
| $L_3$ | 5 | INF | 2.786 | Fluorite glass | 13 | 0.02 | 1.000 |
| | 6 | −4.1 | 0.585821 | | 47 | 13.356 | 0.866 |
| $L_4$ | 7 | −3.179 | 1 | Quartz glass | 61 | 12.418 | 0.876 |
| | 8 | 13.25 | 0.205879 | | 53 | 9.536 | 0.905 |
| $L_5$ | 9 | 14.51 | 2.792 | Fluorite glass | 53 | 9.126 | 0.909 |
| | 10 | −8.069 | 0.135719 | | 16 | 2.994 | 0.970 |
| $L_6$ | 11 | 9.175 | 4.016 | Fluorite glass | 43 | 10.694 | 0.893 |
| | 12 | −8.107 | 0.473387 | | 59 | 17.194 | 0.828 |
| $L_7$ | 13 | −6.806 | 1 | Quartz glass | 65 | 17.58 | 0.824 |
| | 14 | 9.394 | 0.205775 | | 54 | 15.092 | 0.849 |
| $L_8$ | 15 | 9.73 | 4.65 | Fluorite glass | 54 | 14.998 | 0.850 |
| | 16 | −7.998 | 0.105412 | | 53 | 14.768 | 0.852 |
| $L_9$ | 17 | −8.397 | 1 | Quartz glass | 50 | 14.076 | 0.859 |
| | 18 | 13.99 | 0.1 | | 40 | 5.229 | 0.948 |
| $L_{10}$ | 19 | 12.513 | 4.035695 | Fluorite glass | 43 | 8.244 | 0.918 |
| | 20 | −10.732 | 0.1 | | 39 | 8.632 | 0.914 |
| $L_{11}$ | 21 | 35.892 | 1 | Quartz glass | 2 | 0.026 | 1.000 |
| | 22 | 6.835 | 0.201239 | | 52 | 13.928 | 0.861 |
| $L_{12}$ | 23 | 6.916 | 4.203 | Fluorite glass | 52 | 14.038 | 0.860 |
| | 24 | −10.627 | 0.2075 | | 51 | 11.992 | 0.880 |
| $L_{13}$ | 25 | −10.072 | 0.96 | Quartz glass | 52 | 13.038 | 0.870 |
| | 26 | 101.798 | 0.1 | | 7 | 0.032 | 1.000 |
| $L_{14}$ | 27 | 10.53 | 0.9 | Quartz glass | 12 | 0.51 | 0.995 |
| | 28 | 4.509 | 0.527319 | | 62 | 13.7 | 0.863 |
| $L_{15}$ | 29 | 5.379 | 2.576 | Fluorite glass | 52 | 14.144 | 0.859 |
| | 30 | −51.505 | 0.1 | | 16 | 0.0085 | 1.000 |
| $L_{16}$ | 31 | 6.736 | 1.742 | Fluorite glass | 15 | 2.163 | 0.978 |
| | 32 | 17.567 | 0.1 | | 12 | 0.006 | 1.000 |
| $L_{17}$ | 33 | 4.099 | 1.818 | Fluorite glass | 15 | 6.229 | 0.938 |
| | 34 | 9.003 | 0.10016 | | 21 | 0.079 | 0.999 |
| $L_{18}$ | 35 | 1.883 | 1.872 | Quartz glass | 17 | 10.502 | 0.895 |
| | 36 | 5.293 | 0.262779 | | 58 | 10.261 | 0.897 |

Transmittance of the objective lens at NA = 0.9:0.038

TABLE 13

| Surface number | | Curvature | Thickness and Internval | Material | Incident Angle | Reflectance | Transmittance |
|---|---|---|---|---|---|---|---|
| $L_1$ | 1 | 2.562 | 2.562 | Quartz glass | 35 | 9.479 | 0.905 |
| | 2 | 2.11 | 0.7 | | 21 | 2.506 | 0.975 |
| $L_2$ | 3 | −2.503 | 0.7 | Fluorite glass | 26 | 1.75 | 0.983 |
| | 4 | 3.929 | 5.212314 | | 26 | 0.402 | 0.996 |
| $L_3$ | 5 | INF | 2.786 | Fluorite glass | 12 | 0.022 | 1.000 |
| | 6 | −4.1 | 0.585821 | | 41 | 11.585 | 0.884 |
| $L_4$ | 7 | −3.179 | 1 | Quartz glass | 53 | 12.649 | 0.874 |
| | 8 | 13.25 | 0.205879 | | 44 | 3.864 | 0.961 |
| $L_5$ | 9 | 14.51 | 2.792 | Fluorite glass | 43 | 3.204 | 0.968 |
| | 10 | −8.069 | 0.135719 | | 15 | 0.886 | 0.991 |
| $L_6$ | 11 | 9.175 | 4.016 | Fluorite glass | 36 | 5.7 | 0.943 |
| | 12 | −8.107 | 0.473387 | | 46 | 11.252 | 0.887 |
| $L_7$ | 13 | −6.806 | 1 | Quartz glass | 51 | 14.298 | 0.857 |
| | 14 | 9.394 | 0.205775 | | 41 | 7.34 | 0.927 |
| $L_8$ | 15 | 9.73 | 4.65 | Fluorite glass | 41 | 7.022 | 0.930 |
| | 16 | −7.998 | 0.105412 | | 42 | 10.306 | 0.897 |
| $L_9$ | 17 | −8.397 | 1 | Quartz glass | 40 | 8.73 | 0.913 |
| | 18 | 13.99 | 0.1 | | 31 | 1.38 | 0.986 |
| $L_{10}$ | 19 | 12.513 | 4.035695 | Fluorite glass | 33 | 2.464 | 0.975 |
| | 20 | −10.732 | 0.1 | | 31 | 3.548 | 0.965 |
| $L_{11}$ | 21 | 35.892 | 1 | Quartz glass | 2 | 0.026 | 1.000 |
| | 22 | 6.835 | 0.201239 | | 42 | 11.607 | 0.884 |
| $L_{12}$ | 23 | 6.916 | 4.203 | Fluorite glass | 42 | 11.607 | 0.884 |
| | 24 | −10.627 | 0.2075 | | 41 | 5.334 | 0.947 |
| $L_{13}$ | 25 | −10.072 | 0.96 | Quartz glass | 41 | 5.678 | 0.943 |
| | 26 | 101.798 | 0.1 | | 6 | 0.034 | 1.000 |
| $L_{14}$ | 27 | 10.53 | 0.9 | Quartz glass | 10 | 0.145 | 0.999 |
| | 28 | 4.509 | 0.527319 | | 49 | 13.44 | 0.866 |
| $L_{15}$ | 29 | 5.379 | 2.576 | Fluorite glass | 42 | 11.607 | 0.884 |
| | 30 | −51.505 | 0.1 | | 15 | 0.0148 | 1.000 |

TABLE 13-continued

| Surface number | | Curvature | Thickness and Internval | Material | Incident Angle | Reflectance | Transmittance |
|---|---|---|---|---|---|---|---|
| $L_{16}$ | 31 | 6.736 | 1.742 | Fluorite glass | 12 | 0.868 | 0.991 |
| | 32 | 17.567 | 0.1 | | 12 | 0.01 | 1.000 |
| $L_{17}$ | 33 | 4.099 | 1.818 | Fluorite glass | 12 | 3.288 | 0.967 |
| | 34 | 9.003 | 0.10016 | | 20 | 0.0315 | 1.000 |
| $L_{18}$ | 35 | 1.883 | 1.872 | Quartz glass | 13 | 8.304 | 0.917 |
| | 36 | 5.293 | 0.262779 | | 50 | 4.377 | 0.956 |

Transmittance of the objective lens at NA = 0.8:0.129

TABLE 14

| Surface number | | Curvature | Thickness and Internval | Material | Incident Angle | Reflectance | Transmittance |
|---|---|---|---|---|---|---|---|
| $L_1$ | 1 | 2.562 | 2.562 | Quartz glass | 30 | 5.862 | 0.941 |
| | 2 | 2.11 | 0.7 | | 19 | 1.2252 | 0.988 |
| $L_2$ | 3 | −2.503 | 0.7 | Fluorite glass | 23 | 0.717 | 0.993 |
| | 4 | 3.929 | 5.212314 | | 23 | 0.181 | 0.998 |
| $L_3$ | 5 | INF | 2.786 | Fluorite glass | 11 | 0.25 | 0.998 |
| | 6 | −4.1 | 0.585821 | | 36 | 8.619 | 0.914 |
| $L_4$ | 7 | −3.179 | 1 | Quartz glass | 46 | 13.062 | 0.869 |
| | 8 | 13.25 | 0.205879 | | 37 | 1.346 | 0.987 |
| $L_5$ | 9 | 14.51 | 2.792 | Fluorite glass | 36 | 1.148 | 0.989 |
| | 10 | −8.069 | 0.135719 | | 13 | 0.662 | 0.993 |
| $L_6$ | 11 | 9.175 | 4.016 | Fluorite glass | 30 | 2.228 | 0.978 |
| | 12 | −8.107 | 0.473387 | | 38 | 5.819 | 0.942 |
| $L_7$ | 13 | −6.806 | 1 | Quartz glass | 42 | 9.288 | 0.907 |
| | 14 | 9.394 | 0.205775 | | 33 | 2.72 | 0.973 |
| $L_8$ | 15 | 9.73 | 4.65 | Fluorite glass | 33 | 2.447 | 0.976 |
| | 16 | −7.998 | 0.105412 | | 34 | 5.018 | 0.950 |
| $L_9$ | 17 | −8.397 | 1 | Quartz glass | 33 | 4.12 | 0.959 |
| | 18 | 13.99 | 0.1 | | 25 | 0.32 | 0.997 |
| $L_{10}$ | 19 | 12.513 | 4.035695 | Fluorite glass | 27 | 0.708 | 0.993 |
| | 20 | −10.732 | 0.1 | | 26 | 1.18 | 0.988 |
| $L_{11}$ | 21 | 35.892 | 1 | Quartz glass | 1 | 0.033 | 1.000 |
| | 22 | 6.835 | 0.201239 | | 35 | 7.157 | 0.928 |
| $L_{12}$ | 23 | 6.916 | 4.203 | Fluorite glass | 35 | 6.861 | 0.931 |
| | 24 | −10.627 | 0.2075 | | 33 | 1.76 | 0.982 |
| $L_{13}$ | 25 | −10.072 | 0.96 | Quartz glass | 34 | 1.95 | 0.981 |
| | 26 | 101.798 | 0.1 | | 5 | 0.0359 | 1.000 |
| $L_{14}$ | 27 | 10.53 | 0.9 | Quartz glass | 9 | 0.019 | 1.000 |
| | 28 | 4.509 | 0.527319 | | 40 | 11.156 | 0.888 |
| $L_{15}$ | 29 | 5.379 | 2.576 | Fluorite glass | 34 | 6.839 | 0.932 |
| | 30 | −51.505 | 0.1 | | 13 | 0.02 | 1.000 |
| $L_{16}$ | 31 | 6.736 | 1.742 | Fluorite glass | 9 | 0.25 | 0.998 |
| | 32 | 17.567 | 0.1 | | 11 | 0.019 | 1.000 |
| $L_{17}$ | 33 | 4.099 | 1.818 | Fluorite glass | 9 | 1.33 | 0.987 |
| | 34 | 9.003 | 0.10016 | | 17 | 0.006 | 1.000 |
| $L_{18}$ | 35 | 1.883 | 1.872 | Quartz glass | 10 | 5.136 | 0.949 |
| | 36 | 5.293 | 0.262779 | | 42 | 1.632 | 0.984 |

Transmittance of the objective lens at NA = 0.7:0.316

TABLE 15

| Surface number | | Curvature | Thickness and Internval | Material | Incident Angle | Reflectance | Transmittance |
|---|---|---|---|---|---|---|---|
| $L_1$ | 1 | 2.562 | 2.562 | Quartz glass | 21 | 0.938 | 0.991 |
| | 2 | 2.11 | 0.7 | | 14 | 0.084 | 0.999 |
| $L_2$ | 3 | −2.503 | 0.7 | Fluorite glass | 16 | 0.032 | 1.000 |
| | 4 | 3.929 | 5.212314 | | 17 | 0.008 | 1.000 |
| $L_3$ | 5 | INF | 2.786 | Fluorite glass | 8 | 0.031 | 1.000 |
| | 6 | −4.1 | 0.585821 | | 25 | 1.769 | 0.982 |
| $L_4$ | 7 | −3.179 | 1 | Quartz glass | 32 | 6.208 | 0.938 |
| | 8 | 13.25 | 0.205879 | | 25 | 0.0686 | 0.999 |
| $L_5$ | 9 | 14.51 | 2.792 | Fluorite glass | 24 | 0.057 | 0.999 |
| | 10 | −8.069 | 0.135719 | | 10 | 0.04 | 1.000 |
| $L_6$ | 11 | 9.175 | 4.016 | Fluorite glass | 20 | 0.12 | 0.999 |
| | 12 | −8.107 | 0.473387 | | 25 | 0.503 | 0.995 |
| $L_7$ | 13 | −6.806 | 1 | Quartz glass | 27 | 1.154 | 0.988 |
| | 14 | 9.394 | 0.205775 | | 21 | 0.16 | 0.998 |

TABLE 15-continued

| Surface number | | Curvature | Thickness and Internval | Material | Incident Angle | Reflectance | Transmittance |
|---|---|---|---|---|---|---|---|
| $L_8$ | 15 | 9.73 | 4.65 | Fluorite glass | 21 | 0.115 | 0.999 |
| | 16 | −7.998 | 0.105412 | | 23 | 0.483 | 0.995 |
| $L_9$ | 17 | −8.397 | 1 | Quartz glass | 22 | 0.337 | 0.997 |
| | 18 | 13.99 | 0.1 | | 16 | 0.005 | 1.000 |
| $L_{10}$ | 19 | 12.513 | 4.035695 | Fluorite glass | 17 | 0.014 | 1.000 |
| | 20 | −10.732 | 0.1 | | 17 | 0.044 | 1.000 |
| $L_{11}$ | 21 | 35.892 | 1 | Quartz glass | 1 | 0.033 | 1.000 |
| | 22 | 6.835 | 0.201239 | | 23 | 0.85 | 0.992 |
| $L_{12}$ | 23 | 6.916 | 4.203 | Fluorite glass | 23 | 0.85 | 0.992 |
| | 24 | −10.627 | 0.2075 | | 22 | 0.074 | 0.999 |
| $L_{13}$ | 25 | −10.072 | 0.96 | Quartz glass | 22 | 0.106 | 0.999 |
| | 26 | 101.798 | 0.1 | | 3 | 0.0371 | 1.000 |
| $L_{14}$ | 27 | 10.53 | 0.9 | Quartz glass | 6 | 0.009 | 1.000 |
| | 28 | 4.509 | 0.527319 | | 26 | 2.185 | 0.978 |
| $L_{15}$ | 29 | 5.379 | 2.576 | Fluorite glass | 22 | 0.076 | 0.992 |
| | 30 | −51.505 | 0.1 | | 9 | 0.029 | 1.000 |
| $L_{16}$ | 31 | 6.736 | 1.742 | Fluorite glass | 6 | 0.005 | 1.000 |
| | 32 | 17.567 | 0.1 | | 8 | 0.025 | 1.000 |
| $L_{17}$ | 33 | 4.099 | 1.818 | Fluorite glass | 6 | 0.07 | 0.999 |
| | 34 | 9.003 | 0.10016 | | 12 | 0.016 | 1.000 |
| $L_{18}$ | 35 | 1.883 | 1.872 | Quartz glass | 6 | 0.772 | 0.992 |
| | 36 | 5.293 | 0.262779 | | 28 | 0.105 | 0.999 |

Transmittance of the objective lens at NA = 0.5:0.832

Thus, the transmittance at wavelength 248 nm and NA=0.9 shown in Table 12 becomes 3.8%. Similarly, the transmittance at wavelength 248 nm and NA=0.8 shown in Table 13 becomes 12.9%. The transmittance at wavelength 248 nm and NA=0.7 shown in Table 14 becomes 31.6%. The transmittance at wavelength 248 nm and NA=0.5 shown in Table 15 becomes 83.5%.

As a result, when comparing the transmittance of the objective lens of the seventh embodiment in which two wavelength antireflection film is coated and the objective lens of the first comparison example in which two wavelength antireflection film is coated with each lens surface of each single lens L1 to L18, when two wavelength antireflection film of the seventh embodiment as shown in FIG. 21 is coated, high transmittance can be obtained even when NA is 0.9, 0.8, 0.7, and 0.5 as shown in curve A. In contrast, when two-wavelength antireflection film of the first comparison example is applied, it is apparent that transmittance reduces rapidly as shown in curve B as NA becomes large such as 0.7, 0.8, 0.9 as shown in curve B. As a result, high transmittance in 248 nm used for the observation and a high NA, that is, high resolutions can be achieved by coating two-wavelength antireflection film according to the seventh embodiment to each lens surface of each single lens L1 to L18 which configures the objective lens.

(Fourteenth Embodiment)

Figure 22:
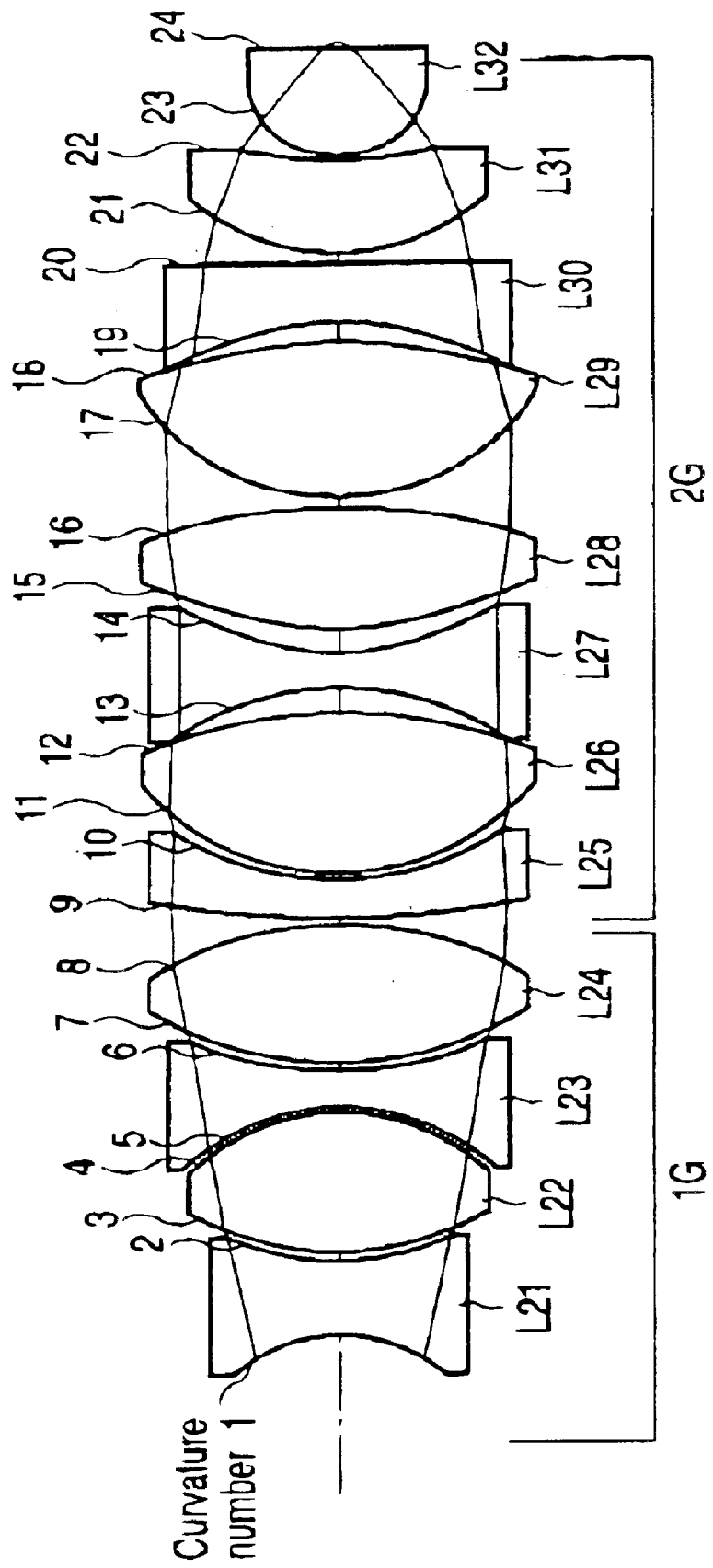
FIG. 22 is a figure showing a schematic configuration of the objective lens used for the fourteenth embodiment of the present invention.

FIG. 22 is a figure showing a schematic configuration of the objective lens applied to the fourteenth embodiment of the present invention.

In this case, the objective lens is used for an optical equipment which observes by the light of wavelength of the ultra-violet region of 300 nm or less and has the mechanism to focus (auto focus) by the light in the wavelength region from a visible region to the near-infrared region. Specifically, 248 nm in the deep-ultraviolet region as wavelength used for the observation and 633 nm in the visible region as wavelength used for auto focus are applied.

The objective lens has the first lens group 1G and the second lens group G2 arranged between the first lens group 1G and the object side as shown in FIG. 22. The first lens group 1G has four single lenses L21 to L24 which include positive lens and negative lens with the different medium and has negative power as a whole The second lens group 2G has eight single lenses L25 to L32 which include positive lens and negative lens with the different medium. In the first and second lens groups 1G and 2G, the air interval is provided between a positive lens and negative lens.

Tables 16 to 19 show the angle of the light which is incident (emitted) to (from) the normal of the lens, reflectance and the transmittance, etc. corresponding thereto, which are obtained when two wavelength antireflection film explained in detail in the seventh embodiment is coated to each lens surface of each single lens L21 to L32 for each of NA 0.9, 0.8, 0.7, and 0.5 of such an objective lens, and the lens data of each single lens L21 to L32 (curvature, thickness, interval, and material name).

TABLE 16

| Surface number | | Curvature | Thickness and Internval | Material | Incident Angle | Reflectance | Transmittance |
|---|---|---|---|---|---|---|---|
| $L_{21}$ | 1 | −3.543 | 2.15 | Quartz glass | 31 | 0.4 | 0.996 |
| | 2 | 6.765 | 0.10358 | | 52 | 1.5 | 0.958 |

TABLE 16-continued

| Surface number | | Curvature | Thickness and Internval | Material | Incident Angle | Reflectance | Transmittance |
|---|---|---|---|---|---|---|---|
| $L_{22}$ | 3 | 6.181 | 3.06 | Fluorite glass | 55 | 2.06 | 0.979 |
| | 4 | −4.042 | 0.153241 | | 53 | 4.6 | 0.954 |
| $L_{23}$ | 5 | −4.08 | 0.92 | Quartz glass | 52 | 4 | 0.960 |
| | 6 | 8.682 | 0.16626 | | 54 | 2 | 0.980 |
| $L_{24}$ | 7 | 8.883 | 3.11 | Fluorite glass | 54 | 2 | 0.980 |
| | 8 | −6.824 | 0.106344 | | 31 | 0.32 | 0.997 |
| $L_{25}$ | 9 | 24.853 | 0.9 | Quartz glass | 9 | 0.03 | 1.000 |
| | 10 | 6.181 | 0.101063 | | 55 | 3.54 | 0.965 |
| $L_{26}$ | 11 | 5.251 | 3.77 | Fluorite glass | 66 | 13 | 0.870 |
| | 12 | −9.936 | 0.61551 | | 45 | 0.96 | 0.990 |
| $L_{27}$ | 13 | −6.165 | 0.9 | Quartz glass | 58 | 5 | 0.950 |
| | 14 | 6.165 | 0.502246 | | 59 | 5.5 | 0.945 |
| $L_{28}$ | 15 | 8.596 | 2.78 | Fluorite glass | 49 | 1.2 | 0.988 |
| | 16 | −12.005 | 0.197219 | | 17 | 0.47 | 0.995 |
| $L_{29}$ | 17 | 5.353 | 3.51 | Fluorite glass | 46 | 2.9 | 0.971 |
| | 18 | −11.031 | 0.488166 | | 54 | 2 | 0.980 |
| $L_{30}$ | 19 | −6.791 | 1.35 | Quartz glass | 65 | 7.52 | 0.925 |
| | 20 | −155.13 | 0.196741 | | 14 | 0.01 | 1.000 |
| $L_{31}$ | 21 | 4.438 | 2.12 | Quartz glass | 23 | 0.22 | 0.998 |
| | 22 | 13.067 | 0.095 | | 19 | 0.15 | 0.999 |
| $L_{32}$ | 23 | 7.961 | 2.33 | Quartz glass | 30 | 2.58 | 0.974 |
| | 24 | 10.691 | 0.2647.8 | | 61 | 4.1 | 0.959 |

Transmittance of the objective lens at NA = 0.9:0.506

TABLE 17

| Surface number | | Curvature | Thickness and Internval | Material | Incident Angle | Reflectance | Transmittance |
|---|---|---|---|---|---|---|---|
| $L_{21}$ | 1 | −3.543 | 2.15 | Quartz glass | 27 | 0.52 | 0.995 |
| | 2 | 6.765 | 0.10358 | | 44 | 1 | 0.990 |
| $L_{22}$ | 3 | 6.181 | 3.06 | Fluorite glass | 46 | 1 | 0.990 |
| | 4 | −4.042 | 0.153241 | | 44 | 1.3 | 0.987 |
| $L_{23}$ | 5 | −4.08 | 0.92 | Quartz glass | 43 | 1.2 | 0.988 |
| | 6 | 8.682 | 0.16626 | | 46 | 1.2 | 0.988 |
| $L_{24}$ | 7 | 8.883 | 3.11 | Fluorite glass | 46 | 1.2 | 0.988 |
| | 8 | −6.824 | 0.106344 | | 27 | 0.48 | 0.995 |
| $L_{25}$ | 9 | 24.853 | 0.9 | Quartz glass | 9 | 0.01 | 1.000 |
| | 10 | 6.181 | 0.101063 | | 48 | 1.3 | 0.987 |
| $L_{26}$ | 11 | 5.251 | 3.77 | Fluorite glass | 56 | 5 | 0.950 |
| | 12 | −9.936 | 0.61551 | | 36 | 0.8 | 0.992 |
| $L_{27}$ | 13 | −6.165 | 0.9 | Quartz glass | 47 | 1 | 0.990 |
| | 14 | 6.165 | 0.502246 | | 51 | 1.5 | 0.985 |
| $L_{28}$ | 15 | 8.596 | 2.78 | Fluorite glass | 43 | 0.85 | 0.992 |
| | 16 | −12.005 | 0.197219 | | 16 | 0.4 | 0.996 |
| $L_{29}$ | 17 | 5.353 | 3.51 | Fluorite glass | 40 | 1.07 | 0.989 |
| | 18 | −11.031 | 0.488166 | | 45 | 1.16 | 0.988 |
| $L_{30}$ | 19 | −6.791 | 1.35 | Quartz glass | 54 | 5 | 0.950 |
| | 20 | −155.13 | 0.196741 | | 14 | 0.01 | 1.000 |
| $L_{31}$ | 21 | 4.438 | 2.12 | Quartz glass | 18 | 0.43 | 0.996 |
| | 22 | 13.067 | 0.095 | | 18 | 0.1 | 0.999 |
| $L_{32}$ | 23 | 7.961 | 2.33 | Quartz glass | 22 | 0.6 | 0.994 |
| | 24 | 10.691 | 0.2647.8 | | 51 | 1.9 | 0.981 |

Transmittance of the objective lens at NA = 0.8:0.745

TABLE 18

| Surface number | | Curvature | Thickness and Internval | Material | Incident Angle | Reflectance | Transmittance |
|---|---|---|---|---|---|---|---|
| $L_{21}$ | 1 | −3.543 | 2.15 | Quartz glass | 23 | 0.61 | 0.994 |
| | 2 | 6.765 | 0.10358 | | 37 | 0.83 | 0.992 |
| $L_{22}$ | 3 | 6.181 | 3.06 | Fluorite glass | 39 | 0.88 | 0.991 |
| | 4 | −4.042 | 0.153241 | | 37 | 0.4 | 0.996 |
| $L_{23}$ | 5 | −4.08 | 0.92 | Quartz glass | 36 | 0.4 | 0.996 |
| | 6 | 8.682 | 0.16626 | | 39 | 0.9 | 0.991 |
| $L_{24}$ | 7 | 8.883 | 3.11 | Fluorite glass | 39 | 0.9 | 0.991 |
| | 8 | −6.824 | 0.106344 | | 23 | 0.61 | 0.994 |
| $L_{25}$ | 9 | 24.853 | 0.9 | Quartz glass | 8 | 0.01 | 1.000 |
| | 10 | 6.181 | 0.101063 | | 41 | 0.6 | 0.994 |

TABLE 18-continued

| Surface number | | Curvature | Thickness and Internval | Material | Incident Angle | Reflectance | Transmittance |
|---|---|---|---|---|---|---|---|
| $L_{26}$ | 11 | 5.251 | 3.77 | Fluorite glass | 47 | 1.2 | 0.988 |
| | 12 | −9.936 | 0.61551 | | 29 | 0.62 | 0.994 |
| $L_{27}$ | 13 | −6.165 | 0.9 | Quartz glass | 38 | 0.59 | 0.994 |
| | 14 | 6.165 | 0.502246 | | 43 | 0.7 | 0.992 |
| $L_{28}$ | 15 | 8.596 | 2.78 | Fluorite glass | 37 | 0.8 | 0.992 |
| | 16 | −12.005 | 0.197219 | | 14 | 0.22 | 0.998 |
| $L_{29}$ | 17 | 5.353 | 3.51 | Fluorite glass | 34 | 0.33 | 0.997 |
| | 18 | −11.031 | 0.488166 | | 38 | 0.85 | 0.992 |
| $L_{30}$ | 19 | −6.791 | 1.35 | Quartz glass | 45 | 0.96 | 0.990 |
| | 20 | −155.13 | 0.196741 | | 13 | 0.01 | 1.000 |
| $L_{31}$ | 21 | 4.438 | 2.12 | Quartz glass | 15 | 0.58 | 0.994 |
| | 22 | 13.067 | 0.095 | | 16 | 0.07 | 0.999 |
| $L_{32}$ | 23 | 7.961 | 2.33 | Quartz glass | 18 | 0.19 | 0.998 |
| | 24 | 10.691 | 0.2647.8 | | 43 | 1.15 | 0.989 |

Transmittance of the objective lens at NA = 0.7:0.865

TABLE 19

| Surface number | | Curvature | Thickness and Internval | Material | Incident Angle | Reflectance | Transmittance |
|---|---|---|---|---|---|---|---|
| $L_{21}$ | 1 | −3.543 | 2.15 | Quartz glass | 16 | 0.4 | 0.996 |
| | 2 | 6.765 | 0.10358 | | 25 | 0.15 | 0.999 |
| $L_{22}$ | 3 | 6.181 | 3.06 | Fluorite glass | 26 | 0.4 | 0.996 |
| | 4 | −4.042 | 0.153241 | | 25 | 0.64 | 0.994 |
| $L_{23}$ | 5 | −4.08 | 0.92 | Quartz glass | 24 | 0.64 | 0.994 |
| | 6 | 8.682 | 0.16626 | | 26 | 0.4 | 0.996 |
| $L_{24}$ | 7 | 8.883 | 3.11 | Fluorite glass | 26 | 0.4 | 0.996 |
| | 8 | −6.824 | 0.106344 | | 16 | 0.42 | 0.996 |
| $L_{25}$ | 9 | 24.853 | 0.9 | Quartz glass | 6 | 0.004 | 1.000 |
| | 10 | 6.181 | 0.101063 | | 28 | 0.65 | 0.994 |
| $L_{26}$ | 11 | 5.251 | 3.77 | Fluorite glass | 32 | 0.66 | 0.993 |
| | 12 | −9.936 | 0.61551 | | 19 | 0.23 | 0.998 |
| $L_{27}$ | 13 | −6.165 | 0.9 | Quartz glass | 26 | 0.6 | 0.994 |
| | 14 | 6.165 | 0.502246 | | 29 | 0.67 | 0.993 |
| $L_{28}$ | 15 | 8.596 | 2.78 | Fluorite glass | 25 | 0.46 | 0.995 |
| | 16 | −12.005 | 0.197219 | | 10 | 0.07 | 0.999 |
| $L_{29}$ | 17 | 5.353 | 3.51 | Fluorite glass | 23 | 0.61 | 0.994 |
| | 18 | −11.031 | 0.488166 | | 25 | 0.29 | 0.997 |
| $L_{30}$ | 19 | −6.791 | 1.35 | Quartz glass | 30 | 0.61 | 0.994 |
| | 20 | −155.13 | 0.196741 | | 9 | 0.01 | 1.000 |
| $L_{31}$ | 21 | 4.438 | 2.12 | Quartz glass | 10 | 0.39 | 0.996 |
| | 22 | 13.067 | 0.095 | | 11 | 0.01 | 1.000 |
| $L_{32}$ | 23 | 7.961 | 2.33 | Quartz glass | 12 | 0.57 | 0.994 |
| | 24 | 10.691 | 0.2647.8 | | 29 | 0.3 | 0.997 |

Transmittance of the objective lens at NA = 0.5:0.908

Thus, the transmittance at wavelength 248 nm and NA=0.9 shown in Table 16 becomes 50.6%. Similarly, the transmittance at wavelength 248 nm and NA=0.8 shown in Table 17 becomes 74.5%. The transmittance at wavelength 248 nm and NA=0.7 shown in Table 18 becomes 86.5%. The transmittance at wavelength 248 nm and NA=0.5 shown in Table 19 becomes 90.8%.

On the other hand, Tables 20 to 23 show the angle of the light which is incident (emitted) to (from) the normal of the lens, reflectance and the transmittance, etc. corresponding thereto, which are obtained when two wavelength antireflection film explained in detail in the first comparison example is provided to each lens surface of each single lens L21 to L32 for each of NA=0.9, 0.8, 0.7, and 0.5 of such an objective lens, and the lens data of each single lens L21 to L32 (curvature, thickness, interval, and material name).

TABLE 20

| Surface number | | Curvature | Thickness and Internval | Material | Incident Angle | Reflectance | Transmittance |
|---|---|---|---|---|---|---|---|
| $L_{21}$ | 1 | −3.543 | 2.15 | Quartz glass | 31 | 3.3 | 0.967 |
| | 2 | 6.765 | 0.10358 | | 52 | 7 | 0.930 |
| $L_{22}$ | 3 | 6.181 | 3.06 | Fluorite glass | 55 | 10 | 0.900 |
| | 4 | −4.042 | 0.153241 | | 53 | 14 | 0.860 |

TABLE 20-continued

| Surface number | | Curvature | Thickness and Internval | Material | Incident Angle | Reflectance | Transmittance |
|---|---|---|---|---|---|---|---|
| $L_{23}$ | 5 | −4.08 | 0.92 | Quartz glass | 52 | 14 | 0.860 |
| | 6 | 8.682 | 0.16626 | | 54 | 9 | 0.910 |
| $L_{24}$ | 7 | 8.883 | 3.11 | Fluorite glass | 54 | 9.3 | 0.907 |
| | 8 | −6.824 | 0.106344 | | 31 | 3.9 | 0.961 |
| $L_{25}$ | 9 | 24.853 | 0.9 | Quartz glass | 9 | 0.01 | 1.000 |
| | 10 | 6.181 | 0.101063 | | 55 | 11.5 | 0.885 |
| $L_{26}$ | 11 | 5.251 | 3.77 | Fluorite glass | 66 | 22 | 0.780 |
| | 12 | −9.936 | 0.61551 | | 45 | 4.2 | 0.958 |
| $L_{27}$ | 13 | −6.165 | 0.9 | Quartz glass | 58 | 15 | 0.850 |
| | 14 | 6.165 | 0.502246 | | 59 | 16 | 0.840 |
| $L_{28}$ | 15 | 8.596 | 2.78 | Fluorite glass | 49 | 7.5 | 0.925 |
| | 16 | −12.005 | 0.197219 | | 17 | 0.2 | 0.998 |
| $L_{29}$ | 17 | 5.353 | 3.51 | Fluorite glass | 46 | 12.5 | 0.975 |
| | 18 | −11.031 | 0.488166 | | 54 | 7.5 | 0.925 |
| $L_{30}$ | 19 | −6.791 | 1.35 | Quartz glass | 65 | 19.5 | 0.805 |
| | 20 | −155.13 | 0.196741 | | 14 | 0.02 | 1.000 |
| $L_{31}$ | 21 | 4.438 | 2.12 | Quartz glass | 23 | 4 | 0.960 |
| | 22 | 13.067 | 0.095 | | 19 | 0.04 | 1.000 |
| $L_{32}$ | 23 | 7.961 | 2.33 | Quartz glass | 30 | 11 | 0.890 |
| | 24 | 10.691 | 0.2647.8 | | 61 | 9 | 0.910 |

Transmittance of the objective lens at NA = 0.9:0.105

TABLE 21

| Surface number | | Curvature | Thickness and Internval | Material | Incident Angle | Reflectance | Transmittance |
|---|---|---|---|---|---|---|---|
| $L_{21}$ | 1 | −3.543 | 2.15 | Quartz glass | 27 | 2 | 0.980 |
| | 2 | 6.765 | 0.10358 | | 44 | 3.3 | 0.967 |
| $L_{22}$ | 3 | 6.181 | 3.06 | Fluorite glass | 46 | 4.3 | 0.957 |
| | 4 | −4.042 | 0.153241 | | 44 | 10 | 0.900 |
| $L_{23}$ | 5 | −4.08 | 0.92 | Quartz glass | 43 | 9 | 0.910 |
| | 6 | 8.682 | 0.16626 | | 46 | 4 | 0.960 |
| $L_{24}$ | 7 | 8.883 | 3.11 | Fluorite glass | 46 | 4 | 0.960 |
| | 8 | −6.824 | 0.106344 | | 27 | 2 | 0.980 |
| $L_{25}$ | 9 | 24.853 | 0.9 | Quartz glass | 9 | 0.01 | 1.000 |
| | 10 | 6.181 | 0.101063 | | 48 | 9 | 0.910 |
| $L_{26}$ | 11 | 5.251 | 3.77 | Fluorite glass | 56 | 15 | 0.850 |
| | 12 | −9.936 | 0.61551 | | 36 | 1.6 | 0.984 |
| $L_{27}$ | 13 | −6.165 | 0.9 | Quartz glass | 47 | 8 | 0.920 |
| | 14 | 6.165 | 0.502246 | | 51 | 10 | 0.900 |
| $L_{28}$ | 15 | 8.596 | 2.78 | Fluorite glass | 43 | 4 | 0.960 |
| | 16 | −12.005 | 0.197219 | | 16 | 0.1 | 0.999 |
| $L_{29}$ | 17 | 5.353 | 3.51 | Fluorite glass | 40 | 9 | 0.910 |
| | 18 | −11.031 | 0.488166 | | 45 | 3 | 0.970 |
| $L_{30}$ | 19 | −6.791 | 1.35 | Quartz glass | 54 | 10 | 0.900 |
| | 20 | −155.13 | 0.196741 | | 14 | 0.02 | 1.000 |
| $L_{31}$ | 21 | 4.438 | 2.12 | Quartz glass | 18 | 1.9 | 0.981 |
| | 22 | 13.067 | 0.095 | | 18 | 0.03 | 1.000 |
| $L_{32}$ | 23 | 7.961 | 2.33 | Quartz glass | 22 | 7 | 0.930 |
| | 24 | 10.691 | 0.2647.8 | | 51 | 3 | 0.970 |

Transmittance of the objective lens at NA = 0.8:0.285

TABLE 22

| Surface number | | Curvature | Thickness and Internval | Material | Incident Angle | Reflectance | Transmittance |
|---|---|---|---|---|---|---|---|
| $L_{21}$ | 1 | −3.543 | 2.15 | Quartz glass | 23 | 0.9 | 0.991 |
| | 2 | 6.765 | 0.10358 | | 37 | 1.2 | 0.988 |
| $L_{22}$ | 3 | 6.181 | 3.06 | Fluorite glass | 39 | 2 | 0.980 |
| | 4 | −4.042 | 0.153241 | | 37 | 5.5 | 0.945 |
| $L_{23}$ | 5 | −4.08 | 0.92 | Quartz glass | 36 | 5 | 0.950 |
| | 6 | 8.682 | 0.16626 | | 39 | 1.5 | 0.985 |
| $L_{24}$ | 7 | 8.883 | 3.11 | Fluorite glass | 39 | 1.5 | 0.985 |
| | 8 | −6.824 | 0.106344 | | 23 | 1.95 | 0.981 |
| $L_{25}$ | 9 | 24.853 | 0.9 | Quartz glass | 8 | 0.01 | 1.000 |
| | 10 | 6.181 | 0.101063 | | 41 | 5 | 0.950 |
| $L_{26}$ | 11 | 5.251 | 3.77 | Fluorite glass | 47 | 9.5 | 0.905 |
| | 12 | −9.936 | 0.61551 | | 29 | 0.55 | 0.995 |

TABLE 22-continued

| Surface number | | Curvature | Thickness and Internval | Material | Incident Angle | Reflectance | Transmittance |
|---|---|---|---|---|---|---|---|
| $L_{27}$ | 13 | −6.165 | 0.9 | Quartz glass | 38 | 3.6 | 0.964 |
| | 14 | 6.165 | 0.502246 | | 43 | 5.5 | 0.945 |
| $L_{28}$ | 15 | 8.596 | 2.78 | Fluorite glass | 37 | 2 | 0.980 |
| | 16 | −12.005 | 0.197219 | | 14 | 0.05 | 1.000 |
| $L_{29}$ | 17 | 5.353 | 3.51 | Fluorite glass | 34 | 5.3 | 0.947 |
| | 18 | −11.031 | 0.488166 | | 38 | 1.2 | 0.988 |
| $L_{30}$ | 19 | −6.791 | 1.35 | Quartz glass | 45 | 4.2 | 0.958 |
| | 20 | −155.13 | 0.196741 | | 13 | 0.01 | 1.000 |
| $L_{31}$ | 21 | 4.438 | 2.12 | Quartz glass | 15 | 0.85 | 0.992 |
| | 22 | 13.067 | 0.095 | | 16 | 0.02 | 1.000 |
| $L_{32}$ | 23 | 7.961 | 2.33 | Quartz glass | 18 | 4.5 | 0.955 |
| | 24 | 10.691 | 0.2647.8 | | 43 | 1.6 | 0.984 |

Transmittance of the objective lens at NA = 0.7:0.522

TABLE 23

| Surface number | | Curvature | Thickness and Internval | Material | Incident Angle | Reflectance | Transmittance |
|---|---|---|---|---|---|---|---|
| $L_{21}$ | 1 | −3.543 | 2.15 | Quartz glass | 16 | 0.1 | 0.999 |
| | 2 | 6.765 | 0.10358 | | 25 | 0.15 | 0.999 |
| $L_{22}$ | 3 | 6.181 | 3.06 | Fluorite glass | 26 | 0.2 | 0.998 |
| | 4 | −4.042 | 0.153241 | | 25 | 0.85 | 0.992 |
| $L_{23}$ | 5 | −4.08 | 0.92 | Quartz glass | 24 | 0.85 | 0.992 |
| | 6 | 8.682 | 0.16626 | | 26 | 0.2 | 0.998 |
| $L_{24}$ | 7 | 8.883 | 3.11 | Fluorite glass | 26 | 0.2 | 0.998 |
| | 8 | −6.824 | 0.106344 | | 16 | 0.15 | 0.999 |
| $L_{25}$ | 9 | 24.853 | 0.9 | Quartz glass | 6 | 0.01 | 1.000 |
| | 10 | 6.181 | 0.101063 | | 28 | 0.75 | 0.993 |
| $L_{26}$ | 11 | 5.251 | 3.77 | Fluorite glass | 32 | 1.8 | 0.982 |
| | 12 | −9.936 | 0.61551 | | 19 | 0.07 | 0.999 |
| $L_{27}$ | 13 | −6.165 | 0.9 | Quartz glass | 26 | 0.45 | 0.996 |
| | 14 | 6.165 | 0.502246 | | 29 | 0.7 | 0.993 |
| $L_{28}$ | 15 | 8.596 | 2.78 | Fluorite glass | 25 | 0.24 | 0.998 |
| | 16 | −12.005 | 0.197219 | | 10 | 0.02 | 1.000 |
| $L_{29}$ | 17 | 5.353 | 3.51 | Fluorite glass | 23 | 0.85 | 0.992 |
| | 18 | −11.031 | 0.488166 | | 25 | 0.13 | 0.999 |
| $L_{30}$ | 19 | −6.791 | 1.35 | Quartz glass | 30 | 0.47 | 0.995 |
| | 20 | −155.13 | 0.196741 | | 9 | 0.01 | 1.000 |
| $L_{31}$ | 21 | 4.438 | 2.12 | Quartz glass | 10 | 0.1 | 0.999 |
| | 22 | 13.067 | 0.095 | | 11 | 0.01 | 1.000 |
| $L_{32}$ | 23 | 7.961 | 2.33 | Quartz glass | 12 | 0.8 | 0.992 |
| | 24 | 10.691 | 0.2647.8 | | 29 | 0.19 | 0.998 |

Transmittance of the objective lens at NA = 0.5:0.911

Thus, the transmittance at wavelength 248 nm and NA 0.9 shown in Table 20 becomes 10.5%. Similarly, the transmittance at wavelength 248 nm and NA=0.8 shown in Table 21 becomes 28.5%. The transmittance at wavelength 248 nm and NA=0.7 shown in Table 22 becomes 52.2%. The transmittance at wavelength 248 nm and NA=0.5 shown in Table 23 becomes 91.1%.

As a result, when comparing the transmittance of the objective lens of the seventh embodiment in which two wavelength antireflection film is coated and the objective lens of the first comparison example in which two wavelength antireflection film is coated with each lens surface of each single lens L21 to L32, when two wavelength antireflection film of the ninth embodiment as shown in FIG. 23 is coated, high transmittance can be obtained even in a case that NA is 0.8, and 0.9 as shown in curve A. In contrast, when two-wavelength antireflection film of the second comparison example is coated, it is apparent that transmittance reduces rapidly as shown in curve B as NA becomes large such as 0.7, 0.8, 0.9 as shown in curve B. As a result, high transmittance in 248 nm used for the observation and a high NA, that is, high resolutions can be achieved by coating two-wavelength antireflection film according to the ninth embodiment to each lens surface of each single lens L21 to L32 which configures the objective lens.

As mentioned above, according to the embodiment of the present invention, the antireflection effect can be achieved in the vicinity of 248 nm and the wavelength region of 600 to 800 nm for substrate (lens) material whose refractive index in the deep-ultraviolet region is 1.4 to 1.52. Even when the incident angle of light becomes large, the antireflection effect is never lost in the vicinity of especially 248 nm. Therefore, high transmittance can be achieved even when the incident angle of the light to the surface of the lens is from vertical to about 65°.

A high antireflection effect can be achieved according to the embodiment of the present invention when applying to quartz glass and fluorite glass which are transparent material in the deep-ultraviolet region used well, especially 248 mm wavelength.

It is preferable the material or refractive index of 1.35 to 1.5 in the deep-ultraviolet region is used as a low refractive index material according to the embodiment of the present invention. Especially, a higher effect can be achieved by using one or more component chosen by the group of $MgF_2$, $SiO_2$, NaF, LiF, and mixture or compound thereof as a material with excellent productivity and a little absorption film in the low refractive index. Among these, $MgF_2$ and $SiO_2$, which have withstand extreme environmental conditions and can be easily obtained, is easy to use for production the effect is high. A high antireflection characteristic can be obtained by using $MgF_2$ to the low refraction layer of the fourth layer (surface layer) from the substrate caused by the low refractive index thereof. Similarly, it is preferable the material is used as the middle refractive index material whose the refractive index in the deep-ultraviolet region is 1.6 to 1.9. Especially, a higher effect can be achieved by using one or more component chosen by the group of $Al_2O_3$, $CaF3$, $NdF3$, $YF_3$, $La_2O_3$, and mixture or compound thereof as a material with excellent productivity and a little absorption film in the low refractive index.

According to the embodiment of the present invention, when the visible or the near-infrared wavelength (auto focus wavelength) which performs antireflection, is within the rage of 650 to 800 nm, the above-mentioned effect can be achieved by setting the range of the film thickness of the first layer from the substrate to $0.4\lambda \leq nd1 \leq 0.6\lambda$, that of the second layer to $0.4\lambda \leq nd2 \leq 0.6\lambda$, that of the third layer to $0.1\lambda \leq nd3 \leq 0.3\lambda$, and that of the fourth layer to $0.2\lambda \leq nd4 \leq 0.35\lambda$, for wavelength $\lambda$ ($\lambda = 248$ nm). In addition, when the range of the film thickness of the first to fourth layer from the substrate are set to $0.4\lambda \leq nd1 \leq 0.6\lambda$, $04 \leq nd2 \leq 0.6\lambda$, $0.2\lambda nd3 \leq 0.3\lambda$, and $0.2\lambda \leq nd4 \leq 0.3\lambda$, respectively, two wavelength antireflection film with high antireflection performance can be obtained in the combination of film material with high refractive index stability and excellent productivity ($MgF_2$, $La_2O_3$, and $Al_2O_3$ mixture material). When the auto focus wavelength is selected an the vicinity of 750 nm, a higher effect can be obtained according to such a range of the film thickness Similarly, when auto focus wavelength is in 650 to 800 nm, the above-mentioned effect can be achieved by setting the range of the film thickness of the first layer from the substrate to $0.5\lambda \leq nd1 \leq 0.7\lambda$, that of the second layer to $0.05\lambda \leq nd2 \leq 0.2\lambda$, that of the third layer to $0.25\lambda \leq nd3 \leq 0.5\lambda$, and that of the fourth layer to $0.2\lambda \leq nd4 \leq 0.35\lambda$, for wavelength $\lambda$ ($\lambda = 248$ nm). In addition, when the range of the film thickness of the first to fourth layer from the substrate are set to $0.6\lambda \leq nd1 \leq 0.7\lambda$, $0.05\lambda \leq nd2 \leq 0.1\lambda$, $0.25\lambda \leq nd3 \leq 0.35\lambda$, and $0.25\lambda \leq nd4 \leq 0.35\lambda$, respectively, two wavelength antireflection film with high antireflection performance can be obtained in the combination of film material with high refractive index stability and excellent productivity ($MgF_2$, $La_2O_3$, and $Al_2O_3$ mixture material). When the auto focus wavelength is selected in the vicinity of 750 nm, a higher effect can be obtained according to such a range of the film thickness.

In the objective lens used for the microscope, which observes by the light of wavelength of the ultraviolet region of 300 nm or less and has the focusing mechanism (auto focus) in the wavelength from the visible region to the near-infrared region, high transmittance and a high NA, that is, high resolving power can be achieved.

The present invention is not limited to the above-described embodiments. Various modifications can occur at its embodying stage without departing from the scope of the invention.

In addition, for example, even if some of all the constituent elements shown in the embodiments are deleted, in the case where the problems described in the Brief Summary of the Invention section can be solved, and advantageous effect described in the Advantageous Effect of the Invention section can be achieved, the configuration can be excerpted after these constituent elements have been deleted.

As mentioned above, according to the present invention, two-wavelength antireflection film in which high transmittance can be achieved in a deep-ultraviolet region and from the visible region to the near-infrared region, and the objective lens on which two-wavelength antireflection film is coated can be achieved.

Additional advantages and modifications will readily occur to those skilled in the art. Therefore, the present invention in its broader aspects is nor limited to the specific details, representative devices, and illustrated examples shown and described herein. Accordingly, various modifications may be made without departing from the spirit or scope of the general inventive concept as defined by the appended claims and their equivalents.

What is claimed is:

1. A two-wavelength antireflection film for antireflection in two-wavelength regions of light between 200 nanometers and 850 nanometers wherein one of the two-wavelength regions ranges from about 200 nanometers to 350 nanometers and includes a design main wavelength and the other two-wavelength region extends from about 650 nanometers to 850 nanometers comprising:

a substrate which is transparent in wavelength regions in which the substrate is to be used;

a first thin film which is formed on the substrate, and has a refractive index of 1.6 to 2.0 and optical film thickness of $0.4\lambda$ to $0.1\lambda$ for the design main wavelength ($\lambda$);

a second thin film which is formed on the first thin film, and has a refractive index of 1.35 to 1.55 and an optical film thickness of $0.05\lambda$ to $0.6\lambda$ for the design main wavelength $\lambda$;

a third thin film which is formed on the second thin film, and has a refractive index of 1.6 to 2.0 and an optical film thickness of $0.1\lambda$ to $0.5\lambda$ for the design main wavelength $\lambda$; and a fourth thin film which is formed on the third thin film, and has a refractive index of 1.35 to 1.55 and optical film thickness of $0.2\lambda$ to $0.35\lambda$ for design main wavelength $\lambda$.

2. The two-wavelength antireflection film according to claim 1, wherein, the substrate is quartz glass or fluorite glass.

3. The two-wavelength antireflection film according to claim 1, wherein, the first thin film, and the third thin film contain material which has a plurality of components chosen by a group of $Al_2O_3$, $LaF_3$, $NdF_3$, $YF_3$, $La_2O_3$, and mixture or compound thereof, and the second thin film and the fourth thin film contain material which has a plurality of components chosen by a group of $MgF_2$, $S_1O_2$, NaF, LiF, and mixture or compound thereof.

4. The two-wavelength antireflection film according to claim 1, wherein an incident angle of the light of the design main wavelength is set within a range of 0° to 70°.

5. The two-wavelength antireflection film according to claim 1, wherein the design main wavelength is 248 nm.

6. The two-wavelength antireflection film according to claim 5, wherein a wavelength which performs antireflection includes two wavelength regions of a wavelength in vicinity of main design wavelength and a wavelength from 650 to 800 nm, an optical film thickness of the first thin film is $0.4\lambda$ to $0.6\lambda$, an optical film thickness of the second thin film is $0.4\lambda$ to $0.6\lambda$, an optical film thickness of the third thin film is $0.1\lambda$ to $0.3\lambda$, and an optical film thickness of the fourth thin film is from $0.35\lambda$ to $0.2\lambda$.

7. The two-wavelength antireflection film according to claim 5, wherein, a wavelength which performs antireflection includes two wavelength regions of a wavelength in vicinity of main design wave length and a wavelength in the vicinity of 750 nm, the first thin film and the third thin film include mixture of $Al_3O_3$ and $La_2O_3$, and the second thin film and fourth thin film include $MgF_2$, an optical film thickness of the first thin film is $0.4\lambda$ to $0.6\lambda$, an optical film thickness of the second thin film is $0.4\lambda$ to $0.6\lambda$, an optical film thickness of the third thin film is $0.2\lambda$ to $0.3\lambda$, and an optical film thickness of the fourth thin film is $0.2\lambda$ to $0.3\lambda$.

8. The two-wavelength antireflection film according to claim 5, wherein, a wavelength which performs antireflection includes two wavelength regions of a wavelength in vicinity of main design wavelength and a wavelength from 550 to 650 nm, an optical film thickness of the first thin film is $0.5\lambda$ to $0.7\lambda$, an optical film thickness of the second thin film is $0.05\lambda$ to $0.2\lambda$, an optical film thickness of the third thin film is $0.25\lambda$ to $0.5\lambda$, and an optical film thickness of the fourth thin film is $0.2\lambda$ to $0.35\lambda$.

9. The two-wavelength antireflection film according to claim 5, wherein a wavelength which performs antireflection includes two wavelength regions of a wavelength in vicinity of main design wave length and a wavelength in vicinity of 600 nm, the first thin film and the third thin film include mixture of $Al_2O_3$ and $La_2O_3$, and the second thin film and fourth thin film include $MgF_2$, an optical film thickness of the first thin film is $0.6\lambda$ to $0.7\lambda$, an optical film thickness of the second thin film is $0.05\lambda$ to $0.1\lambda$, an optical film thickness of the third thin film is $0.25\lambda$ to $0.35\lambda$, and an optical film thickness of the second thin film is $0.25\lambda$ to $0.35\lambda$.

10. An objective lens used for an optical equipment, which performs an observation by the light of the deep-ultraviolet region wavelength of 300 nm or less and has a focusing mechanism (auto focus) in the wavelength region from a visible region to a near-infrared region, comprising a plurality of single lenses, wherein each of the plurality of single lenses has a two-wavelength antireflection film according to claim 1 on the surface thereof.

11. The objective lens according to claim 10, further comprising a first lens group which contains a plurality of single lenses having positive lens and negative lens whose medium are different from each other and has negative power as a whole; and a second lens group which is arranged from the first lens group to the object side, and contains a plurality of single lenses having positive lens and negative lens whose medium are different form each other, wherein the first and second lens groups have air intervals between the positive lens and negative lens, respectively, and a numerical aperture is 0.7 or more.

* * * * *